US012785880B2

(12) United States Patent
Yao et al.

(10) Patent No.: US 12,785,880 B2
(45) Date of Patent: Nov. 3, 2026

(54) TECHNIQUES FOR MANAGING SOUNDING REFERENCE SIGNAL

(71) Applicant: ZTE Corporation, Shenzhen (CN)

(72) Inventors: Ke Yao, Shenzhen (CN); Shujuan Zhang, Shenzhen (CN); Bo Gao, Shenzhen (CN); Yang Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/523,251

(22) Filed: Nov. 29, 2023

(65) Prior Publication Data

US 2024/0106596 A1 Mar. 28, 2024

Related U.S. Application Data

(63) Continuation of application No. PCT/CN2022/109256, filed on Jul. 29, 2022.

(51) Int. Cl.
*H04L 5/00* (2006.01)
*H04W 52/32* (2009.01)

(52) U.S. Cl.
CPC ......... *H04L 5/0048* (2013.01); *H04W 52/325* (2013.01)

(58) Field of Classification Search
CPC ........................... H04L 5/0048; H04W 52/325
See application file for complete search history.

(56) References Cited

U.S. PATENT DOCUMENTS

| | | | | |
|---|---|---|---|---|
| 11,522,660 | B2 * | 12/2022 | Yoo | H04L 5/0048 |
| 12,069,587 | B2 * | 8/2024 | Guo | H04W 52/242 |
| 2019/0081753 | A1 * | 3/2019 | Jung | H04B 7/0695 |
| 2019/0173534 | A1 * | 6/2019 | Kakishima | H04L 5/0048 |
| 2020/0053724 | A1 * | 2/2020 | MolavianJazi | H04L 5/0048 |
| 2020/0259614 | A1 * | 8/2020 | Liu | H04W 72/0446 |
| 2020/0288412 | A1 * | 9/2020 | Ajdakple | H04W 52/365 |
| 2020/0374814 | A1 * | 11/2020 | Gong | H04L 5/0023 |
| 2021/0051645 | A1 | 2/2021 | Manolakos et al. | |

(Continued)

FOREIGN PATENT DOCUMENTS

| | | |
|---|---|---|
| CN | 106455116 A | 2/2017 |
| CN | 112567675 A | 3/2021 |

(Continued)

OTHER PUBLICATIONS

Extended European Search Report for European Patent Application No. 22941867.8, mailed Jul. 1, 2024 (7 pages).

(Continued)

*Primary Examiner* — Melanie Jagannathan

(74) *Attorney, Agent, or Firm* — Ashurst Perkins Coie US LLP

(57) ABSTRACT

Techniques are described for managing and/or transmission of sounding reference signal (SRS). An example wireless communication method includes receiving, by a communication device from a network device, information about at least one sounding reference signal (SRS) occasion in a SRS period; and performing, by the communication device, an SRS transmission corresponding to a SRS occasion based on a muting state that is used to determine whether the SRS occasion is muted, and wherein the SRS occasion is from the at least one SRS occasion.

18 Claims, 15 Drawing Sheets

(56) References Cited

U.S. PATENT DOCUMENTS

| | | | | |
|---|---|---|---|---|
| 2021/0226752 | A1* | 7/2021 | Choi | H04W 72/21 |
| 2021/0328739 | A1 | 10/2021 | Davydov et al. | |
| 2022/0182199 | A1 | 6/2022 | Guo | |
| 2022/0225247 | A1* | 7/2022 | Huang | H04W 52/10 |
| 2023/0030483 | A1* | 2/2023 | Ji | H04L 5/0053 |
| 2023/0078181 | A1* | 3/2023 | Ghanbarinejad | H04W 52/383 370/318 |
| 2023/0084239 | A1* | 3/2023 | Cha | H04W 52/245 455/522 |
| 2023/0111603 | A1* | 4/2023 | Ghimire | G01S 5/0009 455/456.1 |
| 2023/0318782 | A1* | 10/2023 | Go | H04L 5/0023 370/329 |
| 2023/0319727 | A1* | 10/2023 | Chen | H04L 5/0051 370/318 |
| 2025/0286602 | A1* | 9/2025 | Laddu | H04B 7/0696 |

FOREIGN PATENT DOCUMENTS

| | | | |
|---|---|---|---|
| CN | 113841448 | A | 12/2021 |
| CN | 114070504 | A | 2/2022 |
| EP | 3557808 | A1 | 10/2019 |
| WO | 2013/135205 | A1 | 9/2013 |
| WO | 2013/155914 | A1 | 10/2013 |
| WO | 2018/126361 | A1 | 7/2018 |
| WO | 2020/087518 | A1 | 5/2020 |
| WO | 2021093138 | A1 | 5/2021 |

OTHER PUBLICATIONS

International Search Report and Written Opinion for International Application No. PCT/CN2022/109256, mailed on Dec. 22, 2022 (9 pages).

Lenovo et al., "Enhancements on SRS," 3GPP TSG RAN WG1#108-e, R1-2201430, e-Meeting, Feb. 21-Mar. 3, 2022 (13 pages).

Moderator (ZTE), "FL summary #1 on SRS enhancements," 3GPP TSG RAN WG1 Meeting #108-e, R1-2201201, e-Meeting, Feb. 21-Mar. 3, 2022 (53 pages).

Moderator (FUTUREWEI), "FL Summary #4 on SRS enhancements," 3GPP TSG RAN WG1 Meeting #109-e, R1-2205425, e-Meeting, May 9-20, 2022 (87 pages).

CATT, "Discussion on remaining issues on SRS Enhancements for Rel-17," 3GPP TSG RAN WG1 Meeting #108-e, R1-2201333, e-Meeting, Feb. 21-Mar. 3, 2022 (14 pages).

Qualcomm Inc., "SRS enhancement for TDD CJT and 8 Tx operation," 3GPP TSG RAN WG1 #109-e, R1-2205018, e-Meeting, May 9-20, 2022 (7 pages).

Moderator (FUTUREWEI), "FL Summary #3 on SRS enhancements," 3GPP TSG RAN WG1 Meeting #109-e, R1-2205391, e-Meeting, May 9-20, 2022 (63 pages).

* cited by examiner

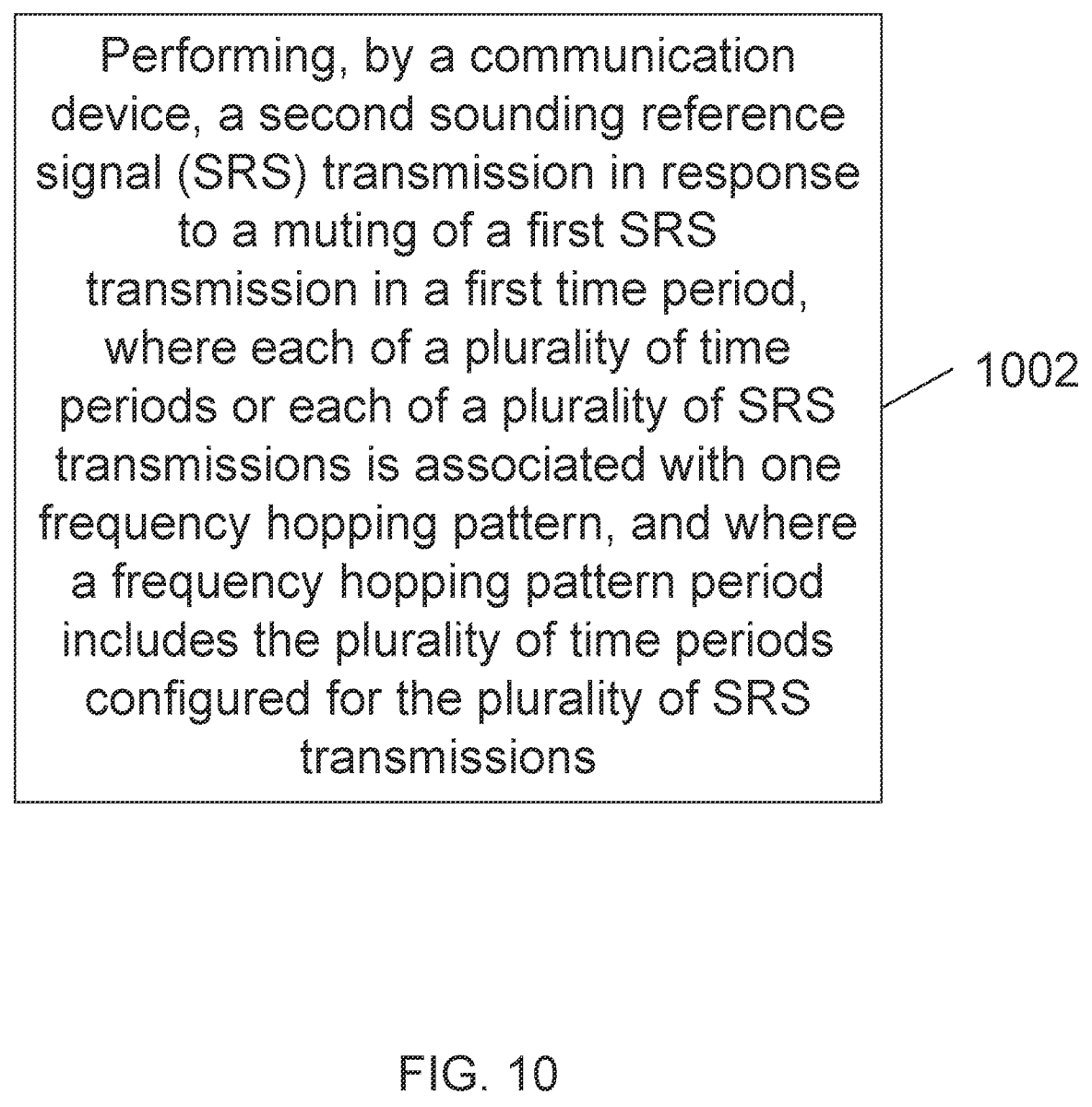

Performing, by a communication device, a second sounding reference signal (SRS) transmission in response to a muting of a first SRS transmission in a first time period, where each of a plurality of time periods or each of a plurality of SRS transmissions is associated with one frequency hopping pattern, and where a frequency hopping pattern period includes the plurality of time periods configured for the plurality of SRS transmissions

1002

FIG. 10

TECHNIQUES FOR MANAGING SOUNDING REFERENCE SIGNAL

CROSS REFERENCE TO RELATED APPLICATIONS

This patent document is a continuation of and claims benefit of priority to International Patent Application No. PCT/CN2022/109256, filed on Jul. 29, 2022. The entire content of the before-mentioned patent application is incorporated by reference as part of the disclosure of this application.

TECHNICAL FIELD

This document is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for managing and/or transmission of sounding reference signal (SRS).

A first wireless communication method includes receiving, by a communication device from a network device, information about at least one sounding reference signal (SRS) occasion in a SRS period; and performing, by the communication device, an SRS transmission corresponding to a SRS occasion based on a muting state that is used to determine whether the SRS occasion is muted, and where the SRS occasion is from the at least one SRS occasion.

In some embodiments, the muting state for the SRS occasion is determined based on any one or more of: a muting period that comprises a number of $T_{muting\text{-}period}$ SRS occasions, a muting offset that comprises a number of $T_{muting\text{-}offset}$ SRS occasions, a muting unit, a muting interval that comprises a number of $T_{muting\text{-}interval}$ SRS occasions, a parameter of frequency hopping, a parameter of SRS period, and/or a parameter for randomization. In some embodiments, the parameter of frequency hopping may comprise the frequency domain starting position or the frequency hopping period, or the parameter to determine the frequency domain starting position, or frequency hopping period, such as $b_{hop}$, $n_{SRS}$, $b_{hop}$ etc. In some embodiments, the parameter of SRS period may comprise a time domain starting position, a frequency domain starting position, or a number of SRS occasions in a SRS period, or the parameter to determine a SRS period, a time domain starting position, a frequency domain starting position, or a number of SRS occasions in a SRS period. In some embodiments, the parameter of randomization may comprise a random sequence, or parameter to generate a pseudo-random sequence. E.g., the initial seed of this random sequence can be same as that for group hopping SRS sequence generation.

In some embodiments, the number $T_{muting\text{-}period}$ is determined according to: a configured or a predetermined integer value, a value based on a hopping period which comprises a number of $T_{hopping\text{-}period}$ SRS occasions, a value based on the SRS period which comprises a number of $T_{SRS\text{-}period}$ SRS occasions, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period.

In some embodiments, the value based on the hopping period $T_{hopping\text{-}period}$ comprises $L0*T_{hopping\text{-}period}$, wherein L0 is an integer or a fraction, and/or wherein the value based on the SRS period $T_{SRS\text{-}period}$ comprises $L1*T_{SRS\text{-}period}$, wherein L1 is an integer or a fraction. In some embodiments, the muting offset value $T_{muting\text{-}offset}$ is determined according to any one or more of: a configured or a predetermined integer value, a value based on a hopping period which comprises a number of $T_{hopping\text{-}period}$ SRS occasions, a value based on an SRS period which comprises a number of $T_{SRS\text{-}period}$ SRS occasions, a value determined based on frequency domain or time domain starting position of a hopping period, or a first SRS occasion position in a hopping period, a value determined based on frequency domain or time domain starting position of a SRS period, or a first SRS occasion position in a SRS period, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period.

In some embodiments, the value based on the hopping period $T_{hopping\text{-}period}$ comprises $L2*T_{hopping\text{-}period}$, wherein L2 is an integer or a fraction, and/or the value based on the SRS period $T_{SRS\text{-}period}$ comprises $L3*T_{SRS\text{-}period}$, wherein L3 is an integer or a fraction. In some embodiments, the muting period comprises a number of N muting units, or the muting unit comprises the SRS occasion, the SRS period, a hopping period, a fraction of the SRS period, or a fraction of the hopping period. In some embodiments, the muting is described from perspective of an SRS occasion. In some embodiments, the muting SRS occasions can be distributed in a muting period. For example, muting SRS occasions can be non-consecutive, with an interval, or a group (e.g., muting unit (e.g., a SRS period, a hopping period)) of muting SRS occasions can be consecutive. In some embodiments, different groups can be non-consecutive. In some embodiments, fraction of SRS period can mean the group of consecutive SRS occasions only refer to part of SRS occasions in a SRS period. For fraction of SRS period, the determined muting SRS occasions can also be non-consecutive. This can be a similar case for fraction of hopping period.

In some embodiments, the muting state of the SRS occasion which belongs to the N SRS muting units is determined as muted, or the muting state of the SRS occasion which does not belong to the N SRS muting units is determined as non-muted. In some embodiments, the number N is determined according to any one or more of: a configured or a predetermined integer value or a fraction value, or a value determined according to the muting period and the muting interval. For example, N can be determined by a floor of (value of muting period/value of muting interval. In some embodiments, the N muting units within the muting period are determined according to any one or more of: a first muting unit is determined by the muting offset value based on beginning of the muting period, one or more subsequent SRS muting units other than the first SRS muting unit are determined according to the muting interval, or the N muting units are consecutive or non-consecutive. In some embodiments, the N muting units are determined based on a hopping pattern of a hopping level, the hopping level is a level configured for the communication device, the hopping level is a level other than the configured level for the communication device, or the hopping pattern of the hopping level comprises at least one frequency hopping position for at least one frequency hopping unit in an predetermined order for at least one SRS occasion.

In some embodiments, one or more certain frequency hopping units are determined as for muting SRS occasions. In some embodiments, the muting interval $T_{muting\text{-}interval}$ is determined based on any one or more of: a configured or a predetermined integer value, a value based on a hopping period which comprises a number of $T_{hopping\text{-}period}$ SRS occasions, a value based on an SRS period which comprises a number of $T_{SRS\text{-}period}$ SRS occasions, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period. In some embodiments, the value based on the hopping period $T_{hopping\text{-}period}$ comprises $L4^*T_{hopping\text{-}period}$, wherein L4 is an integer or a fraction, or the value based on the SRS period $T_{SRS\text{-}period}$ comprises $L5^*T_{SRS\text{-}period}$, wherein L5 is an integer or a fraction.

A second wireless communication method includes performing, by a communication device, a second sounding reference signal (SRS) transmission in response to a muting of a first SRS transmission in a first time period, where each of a plurality of time periods or each of a plurality of SRS transmissions is associated with one frequency hopping pattern, and where a frequency hopping pattern period includes the plurality of time periods configured for the plurality of SRS transmissions.

In some embodiments, the second SRS transmission is performed in a second time period using a frequency hopping pattern associated with the first time period where the first SRS transmission is muted, and the frequency hopping pattern indicates a frequency location where the second SRS transmission is performed. In some embodiments, the frequency hopping pattern period includes the first time period and the second time period. In some embodiments, the second SRS transmission is performed in the first time period using a frequency hopping pattern associated with the second time period, and the frequency hopping pattern indicates a frequency location where the second SRS transmission is performed. In some embodiments, the communication device does not perform the first SRS transmission in the first time period in the frequency hopping pattern period associated with the first time period, or wherein the frequency hopping pattern period includes the second time period.

A third wireless communication method includes performing, by a communication device, a plurality of sounding reference signal (SRS) transmissions in multiple time periods, where the communication device determines a resource block index that identifies a resource block in which to transmit an SRS transmission in a frequency hopping level, and where the resource block index is determined based on a frequency domain position parameter.

In some embodiments, the frequency domain position parameter is updated in every X time periods, wherein X is an integer greater than 1. In some embodiments, the frequency domain position parameter is based on one or more of an SRS frequency domain position, an identifier of the communication device, or a time domain related value. In some embodiments, the frequency domain position parameter is based on one or more shift values, an identifier of the communication device, or a time domain related value.

A fourth wireless communication method includes determining, by a wireless communication device, a transmit power for each of a plurality of sounding reference signal (SRS) resources; and transmitting, by the wireless communication device, a value to indicate a ratio or difference of transmit power between a plurality of SRS resources, to a network device.

In some embodiments, the plurality of SRS resources are for coherent joint transmission, or the plurality of SRS resources are for different TRPs. In some embodiments, different SRS resources are associated with same open loop power control parameter, closed loop power control parameter and respective path-loss RS, or different SRS resources are associated with respective open loop power control parameter, closed loop power control parameter and path-loss RS. In some embodiments, the method further comprises transmitting, by the wireless communication device to the network device, a reference SRS resource for the ratio or the difference, or determining, by the wireless communication device, a reference SRS resource for the ratio or the difference, based on a predefined index, a configured index or an indicated index in the plurality of SRS resources.

A fifth wireless communication method includes receiving, by a communication device, a set of candidate path loss reference signals (PL-RSs) from a network device; and determining, by the communication device, a path-loss based on the PL-RSs according to a predefined rule.

In some embodiments, the predefined rule indicates that the path-loss is determined using a maximum path-loss or an average path-loss from the set of candidate PL-RSs.

A sixth wireless communication method includes transmitting, by a network device to a communication device, a set of candidate path loss reference signals (PL-RSs), where a transmit power of the SRSs is determined according to a predefined rule. In some embodiments, the predefined rule indicates that the SRSs are transmitted to maximize a transmission power of the network device or a beam-specific transmit power.

A seventh wireless communication method includes performing, by a communication device, a plurality of sounding reference signal (SRS) transmissions in multiple resource blocks in multiple time periods, where the communication device determines a resource block level hopping index that identifies a resource block in which to transmit an SRS transmission, where the resource block level hopping index is determined based on a scaling factor, and where the scaling factor is applied to an index of SRS transmissions (e.g., $n_{SRS}$) or a total number of the multiple time periods corresponding to a frequency hopping level $$\left(\text{e.g., } \prod_{b'=b_{hop}}^{B_{SRS}} N_{b'}\right).$$

In some embodiments, the scaling factor has a predefined value or a configured value.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 9-10 show exemplary flowcharts for performing a SRS transmission.

DETAILED DESCRIPTION

The new radio (NR) technology of fifth generation (5G) mobile communication systems is continuously improved to provide higher quality wireless communication. Some of the features for next stage of development may comprise coherent joint transmission (CJT), 8Tx transmit antenna ports for uplink, etc. However, current technology cannot support sounding reference signal (SRS) muting scheme, SRS hopping is not flexible enough, e.g., RB level hopping, bandwidth unit hopping, which may not be good for interference randomization, and/or power control schemes for TRP common SRS or TRP specific SRS may need to be specified. Thus, enhancements to sounding reference signal (SRS) scheme may be needed.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

For periodic and semi-persistent SRS, one or more SRS transmission occasion (also be referred to as SRS occasion, or SRS transmission) is determined per SRS period. An SRS transmission occasion is determined by an offset value, e.g., slot offset, or symbol offset within an SRS period which is of a number of slots, e.g., 4 slots. Each SRS period has a same number of SRS transmission occasions with same relative position within an SRS period.

A frequency hopping period (also be referred to as frequency hopping pattern periodicity, or hopping period) may comprise one or more SRS occasions. E.g., a hopping period may comprise a number $T_{hopping\text{-}period}$ of SRS occasions.

Figure 1:
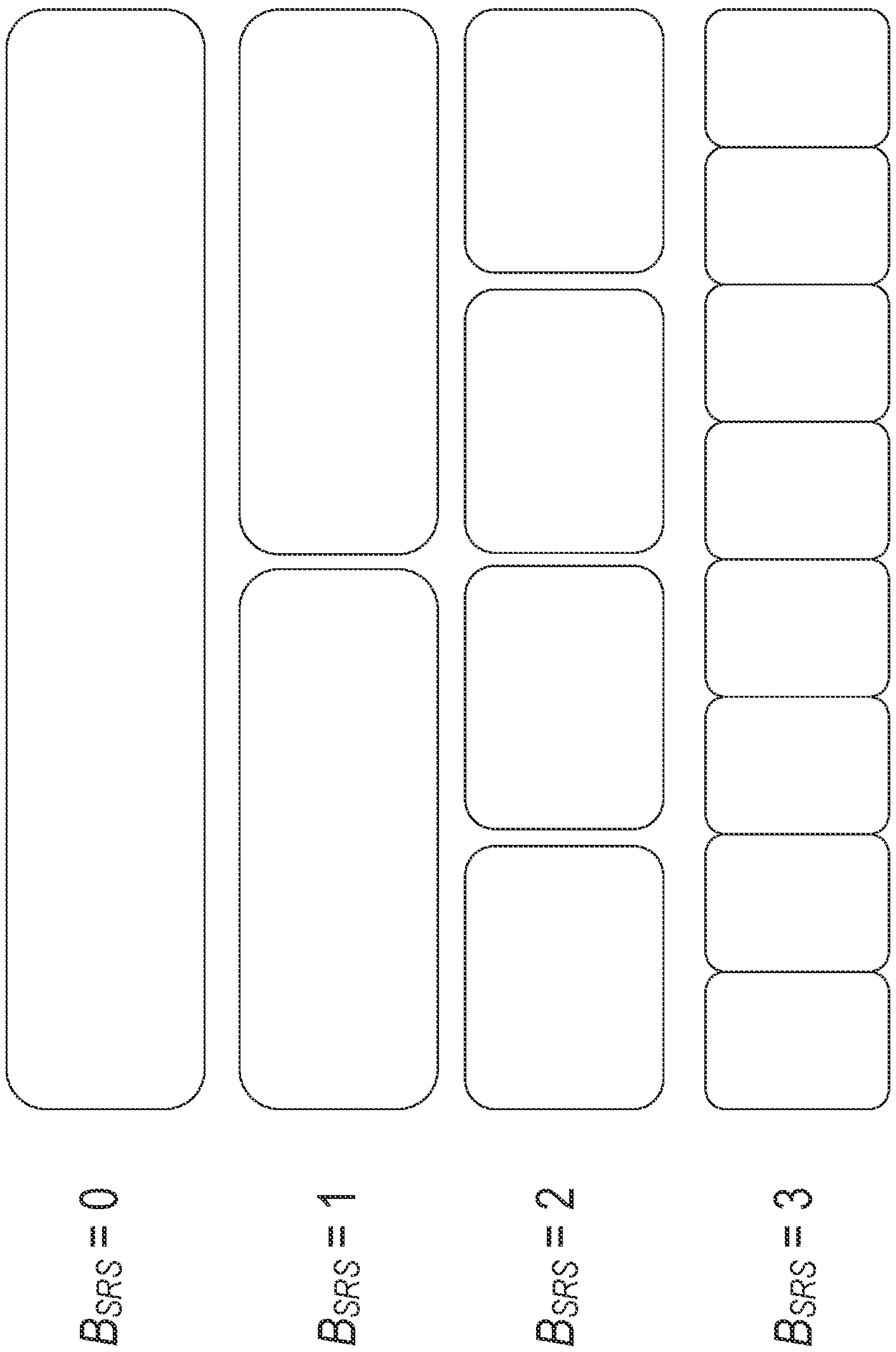
FIG. 1 shows four levels of hopping patterns, where each hopping pattern corresponds to a $B_{SRS}$ value.

A frequency hopping pattern for SRS comprises 4 levels, indexed by parameter $B_{SRS}$. A UE can determine frequency domain resource for an SRS transmission according to a determined frequency hopping pattern. For example, FIG. 1 shows four levels of hopping patterns, where each hopping pattern corresponds to a $B_{SRS}$ value. A UE receives from a gNB/TRP an indication of the $B_{SRS}$ value so that the UE can be configured to any one of the four hopping levels. FIG. 1 shows one or more blocks corresponding to each level, where each block can be referred to as frequency hopping units. As shown in FIG. 1, each of the frequency hopping units (also called hopping bandwidth) in $B_{SRS}$=3 can include 4 RBs. Then each of the frequency hopping units in $B_{SRS}$=2, 1, 0 can be 8 RBs, 16 RBs and 32 RBs respectively. The hopping unit for $B_{SRS}$=3 can also be called as basic hopping unit. $B_{SRS}$ can be used to determine SRS bandwidth.

Figure 2:
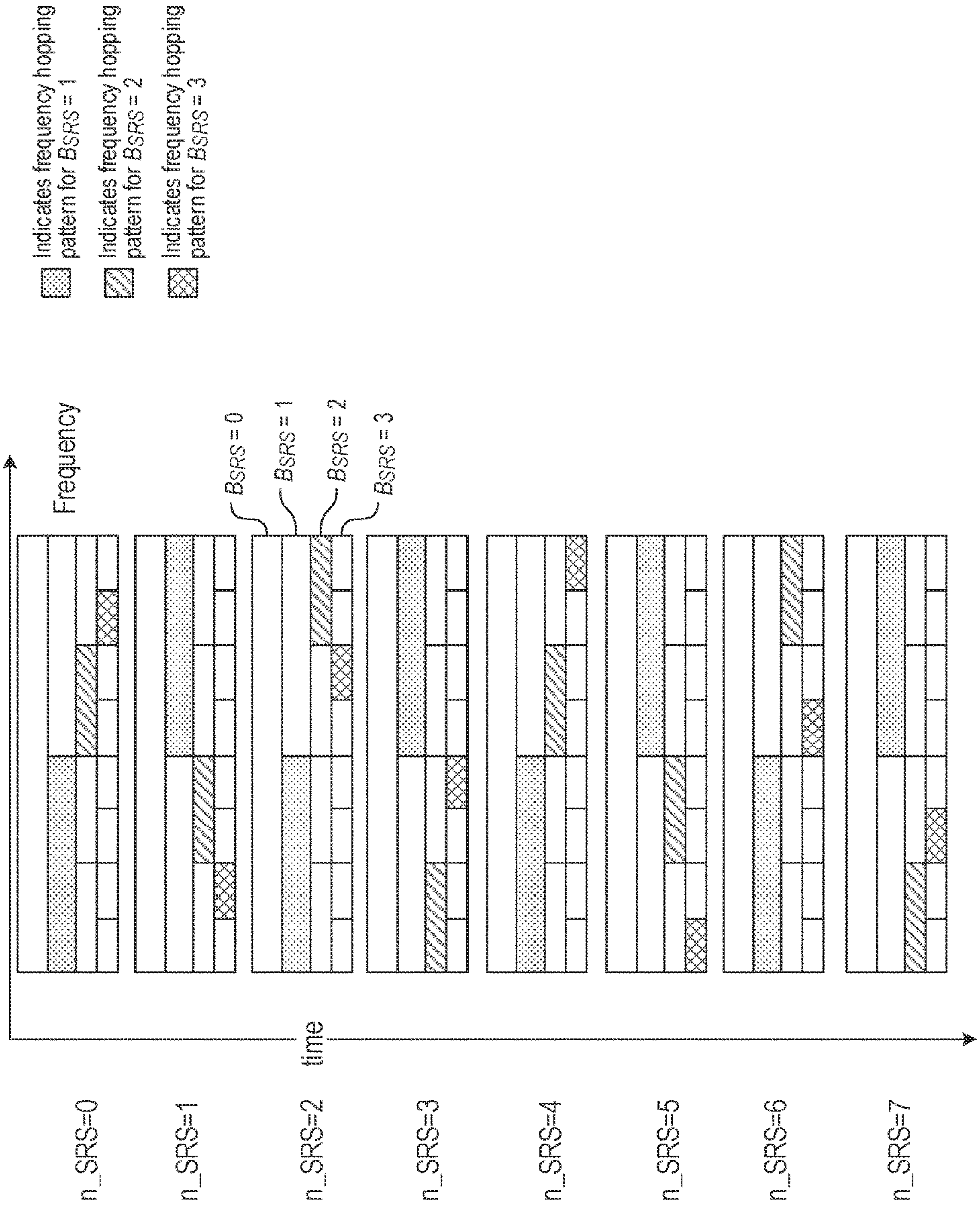
FIG. 2 shows example frequency hopping pattern for four levels.

FIG. 2 shows example frequency hopping patterns for 4 levels. The quantity $n_{SRS}$ counts the number of SRS transmissions (or $n_{SRS}$ is an index that indicates a number associated with an SRS transmission in time domain). The shaded blocks or blocks with pattern are frequency parts that are frequency domain resources for SRS transmission. A UE can be configured by one $B_{SRS}$, and a $b_{hop}$ to determine a frequency hopping pattern, and a parameter $N_{RRC}$ to determine frequency domain starting position of frequency hopping. The parameter $b_{hop}$ is a threshold value that is configured by a gNB/TRP and sent to the UE (e.g., via RRC signaling) so that if the UE determines that a value for a parameter B is greater than $b_{hop}$, then frequency hopping is enabled, and if the UE determines that a value for a parameter B is less than or equal to $b_{hop}$, then frequency hopping is disabled. If a UE is configured $B_{SRS}$=1, two SRS transmissions are performed by the UE (corresponding to 2 consecutive values of $n_{SRS}$), each of which SRS transmission occupies different 16 RBs, can occupy all frequency domain hopping resources. If a UE is configured $B_{SRS}$=3, each SRS transmission occupies different 4 RBs, 8 consecutive SRS transmissions (corresponding to 8 consecutive values of $n_{SRS}$) can occupy all frequency domain hopping resources.

If frequency hopping is enabled for a UE for an SRS transmission, there is a frequency hopping pattern periodicity, e.g., $$T_{hopping\text{-}period} = \prod_{b'=b_{hop}}^{B_{SRS}} N_{b'},$$

where parameters of $b_{hop}$ and $B_{SRS}$ are both configured by gNB (or NW, network), $N_{b'}$ is predefined for b', and $$N_{b_{hop}} = 1.$$

$N_{b'}$ is a number of frequency hopping units in a level b'. For example, for $B_{SRS}$=3, and $b_{hop}$=0, for b'=3, $N_b$=2, for b'=2, $N_b$=2, and for b'=1, $N_b$=2, and $$\prod_{b'=b_{hop}}^{B_{SRS}} N_{b'}$$

is 2*2*2=8.

For example, if a frequency hopping pattern periodicity is 2, every 2 SRS transmissions are transmitted with the first and the second frequency patterns respectively. E.g., the first SRS transmission is transmitted with the first frequency hopping pattern, and the second SRS transmission is transmitted with the second frequency hopping pattern, the third SRS transmission is transmitted with the first frequency hopping pattern, . . . , and the rest SRS transmission can be done in the same manner.

In order to manage inter-TRP cross-SRS interference, e.g., targeting TDD CJT, one technical solution can be via SRS interference randomization, such as randomized transmission of SRS, e.g., pseudo-random muting of SRS transmission for periodic and semi-persistent SRS.

II. Muting SRS

Issue 1: Current technology cannot support SRS muting scheme.

Solutions:

Regarding frequency hopping pattern periodicity, the following schemes can be applied: A muting period (also be referred to as muting pattern periodicity) may comprise one or more SRS occasions. Within one muting period, one or more SRS transmissions (or SRS occasions) are muting SRS transmissions or muting SRS occasions.

Scheme 1.1: If an SRS transmission is muted in one SRS occasion, the SRS transmission is dropped which does not affect other SRS transmission occasion. The frequency hopping pattern for each SRS occasion and frequency hopping pattern periodicity are not affected by SRS muting.

Scheme 1.2: If an SRS transmission is muted or dropped in one SRS occasion, the frequency hopping pattern of the SRS transmission may be applied in next SRS occasion. That means the SRS transmission in next SRS occasion is transmitted with the frequency hopping pattern in previous SRS occasion where the SRS transmission is muted or dropped.

Assuming M SRS transmission occasions are muted among a frequency hopping pattern periodicity, e.g., $$\prod_{b'=b_{hop}}^{B_{SRS}} N_{b'},$$

the frequency hopping pattern periodicity with muted SRS transmissions can be $$\prod_{b'=b_{hop}}^{B_{SRS}} N_{b'} + M.$$

M is an integer which is equal to or larger than 1. Thus, for example, for Scheme 1.2, if the SRS transmission at n_SRS=3 is muted, then the UE transmits SRS at n_SRS=4 with the frequency hopping pattern associated with n_SRS=3. In this patent document, the term "periodicity" can also be referred to as "period".

Scheme 1.3: One frequency hopping pattern periodicity is less than $$\prod_{b'=b_{hop}}^{B_{SRS}} N_{b'},$$

e.g., $$\prod_{b'=b_{hop}}^{B_{SRS}} N_{b'} - M,$$

where M SRS transmission occasions are muted among a frequency hopping pattern periodicity, and M is an integer which is equal to or larger than 1. Thus, for example, for Scheme 1.3, if the SRS transmission at n_SRS=3 is muted, then the UE transmits SRS at n_SRS=4 with the frequency hopping pattern associated with n_SRS=4 and does not perform (or skips) the frequency hopping pattern associated with n_SRS=3. The UE transmits SRS transmission on each SRS occasion. There is no time muting period. If an SRS transmission in an SRS occasion on a frequency hopping resource is supposed to be muted, the time period can be used to transmit SRS with hopping pattern in next SRS occasion.

A muting period may comprise a number of $T_{muting\text{-}period}$ SRS occasions. The number $T_{muting\text{-}period}$ is determined according to:

a. A configured or a predetermined integer value, such as 2, 4, 8, etc. or b. A value based on a hopping period, e.g., L*$T_{hopping\text{-}period}$, wherein L may be an integer, such as 1, 2, 3, etc., or L may be a value of fraction, such as ½, ¼, ⅔, 3/2, etc.

SRS muting may happen in one or more muting units. A muting period may comprise a number of N SRS muting units. Wherein the muting unit can be an SRS occasion, an SRS period (which includes at least one SRS occasion), or a hopping period (which includes at least one SRS occasion each of which corresponding to a hopping unit or a leaf for a level in frequency hopping pattern).

The number N is determined according to:

a. A configured or a predetermined integer value, such as 1, 2, 3, etc., or fraction value, such as ½, ¼, ⅔, 3/2, etc.

i. If the SRS muting unit is hopping period, and N is an integer value, all the SRS occasions in the N hopping periods are muting SRS occasions.

ii. If the SRS muting unit is hopping period, and N is a fraction value, partial of the SRS occasions of N hopping periods (i.e., one or more hopping unites for a level in frequency hopping pattern) are muting SRS occasions. E.g., one hopping period includes 8 different frequency hopping units corresponding to 8 SRS occasions with frequency hopping sequence of 0, 4, 2, 6, 1, 5, 3, 7. N=½ hopping period refers to 4 SRS occasions. The 4 SRS occasions may be 0, 1, 2, 3, or 4, 5, 6, 7, or may be even indexes, or odd indexes.

b. The number of another SRS muting units. E.g., SRS muting unit is an SRS occasion, a muting period may comprise a $L*T_{hopping\text{-}period}$ SRS muting occasions, wherein L may be an integer, such as 1, 2, 3, etc., or L may be a value of fraction, such as ½, ¼, ⅔, 3/2, etc.

The N SRS muting units within the muting period can be determined according to at least one of:

a. A (first) SRS muting unit is determined by an offset value e.g., $T_{muting\text{-}offset}$, SRS muting units, based on beginning of the SRS muting period. Wherein the offset value $T_{muting\text{-}offset}$, can be determined according to:
   i. A configured value, or
   ii. A determined randomized value based on parameters.
   iii. If the SRS muting unit is an SRS period, or a hopping period, an additional offset in unit of SRS occasion should be determined to indicate the first SRS muting occasion.

b. The subsequent SRS muting units are determined periodically with an interval, e.g., a value of $T_{muting\text{-}interval}$, wherein the interval can be
   i. a predefined value, such as 1, 2, etc., or
   ii. a configured value or a randomized value.

c. The N SRS muting units can be consecutive SRS muting units;
   i. E.g., with an interval value of 1.

d. The N SRS muting units can be non-consecutive SRS muting units
   i. E.g., with an interval value of larger than 1, or
   ii. E.g., according to hopping pattern of a hopping level
      1. The hopping level can be the level configured for the UE, or
      2. The hopping level can be the level other than the configured level for the UE, such as a lower indexed level, or a higher indexed level The time domain muting pattern can be determined by:

$$(n_{SRS}-T_{muting\text{-}offset}) \bmod T_{muting\text{-}period}=0, \text{ or}$$

$(n_{SRS}-T_{muting\text{-}offset}) \bmod T_{muting\text{-}period}=0$, wherein k is an additional muting offset value which can be $k=k_{offset}+n*T_{muting\text{-}unit}$. $k_{offset}$ can be a configured value. $T_{muting\text{-}unit}$ is the number of SRS occasions in a muting unit.

$T_{muting\text{-}offset}$ can be one offset value for a first SRS muting occasion (can also be a muting SRS occasion), or plurality of offset values for a set of SRS muting occasions, or a set of first SRS muting occasions. For each first SRS muting occasion, there may be a set of subsequent SRS muting occasions, every two consecutive SRS muting occasions are consecutive SRS occasions, or non-consecutive SRS occasions with a muting interval. The muting interval can be a predetermined or a configured or a random value.

Figure 3:
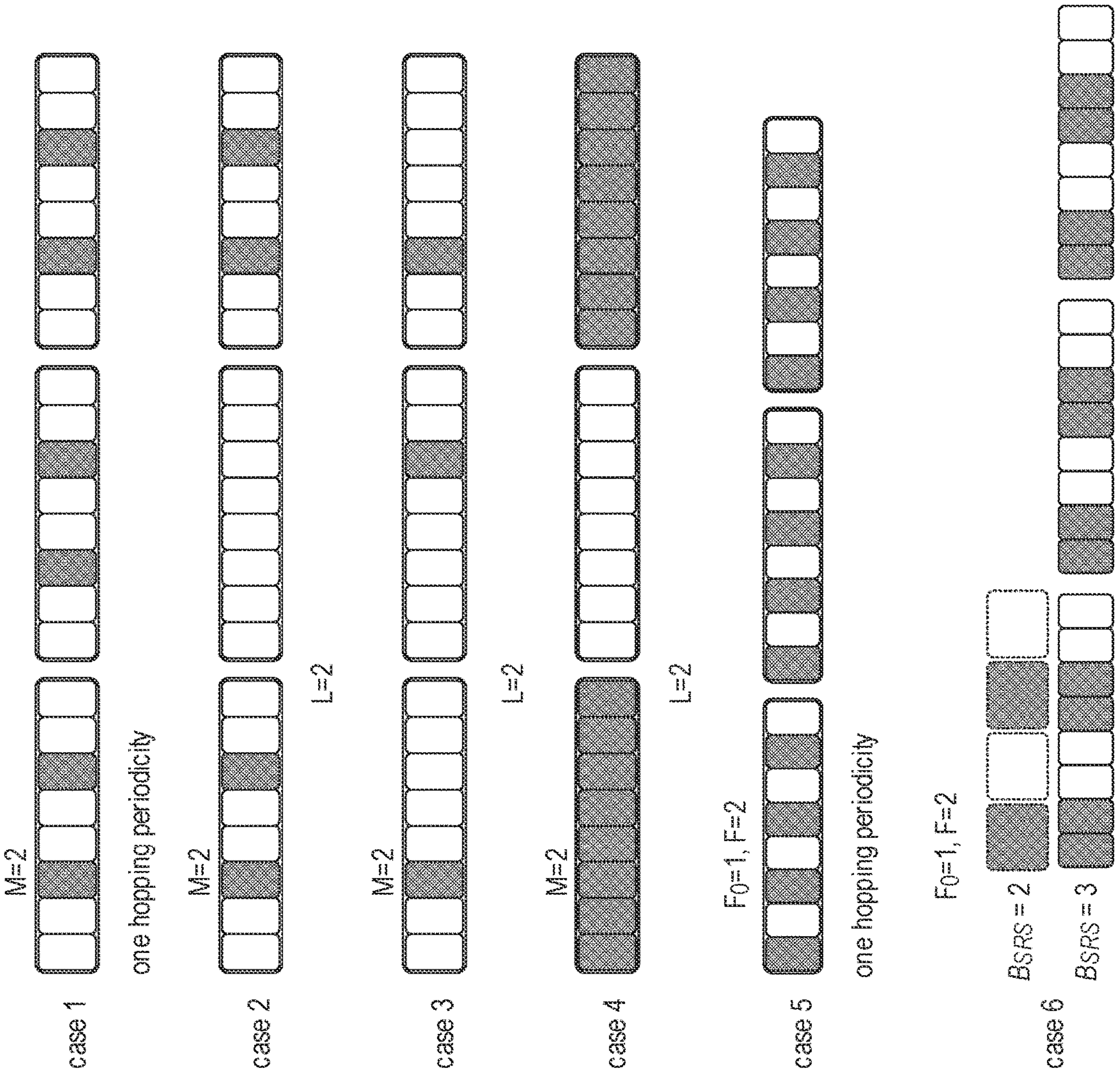
FIG. 3 shows example schemes to mute SRS transmissions.

Regarding SRS muting resources, the following schemes can be applied:

Scheme 2.1: M muting SRS transmissions can be within each frequency hopping pattern periodicity, e.g., as shown in case 1 in FIG. 3. In FIG. 3, the shaded blocks indicates that the SRS transmissions are muted for the frequency hopping units that have the shaded blocks, and the unshaded blocks indicated that the UE performs SRS transmissions in the unshaded frequency hopping units. A SRS muting periodicity for case 1 is one frequency hopping pattern periodicity. The SRS muting periodicity is indicated to the UE.

Scheme 2.2: M muting SRS transmissions can be within one of L frequency hopping pattern periodicities, e.g., as shown in case 2 in FIG. 3. A SRS muting periodicity is L frequency hopping pattern periodicities. The SRS muting periodicity is indicated to the UE.

Scheme 2.3: M muting SRS transmissions can be within L frequency hopping pattern periodicities, e.g., as shown in case 3 in FIG. 3, wherein L is an integer which is larger than 1. Note that the shaded block represents an SRS transmission in one SRS occasion is muted, or dropped. A SRS muting periodicity is L frequency hopping pattern periodicities. The SRS muting periodicity is indicated to the UE.

Scheme 2.4: in case 2, M SRS transmissions can be determined as all SRS transmissions in R frequency hopping pattern periodicities in each L frequency hopping pattern periodicities, where R or L is an integer which is equal to or larger than 1, and R<=L. e.g., if R=1, $$M = R * \prod_{b'=b_{hop}}^{B_{SRS}} N_{b'}.$$

as shown in case 4 in FIG. 3. A SRS muting periodicity is L frequency hopping pattern periodicities. The SRS muting periodicity is indicated to the UE.

For Scheme 2.1~2.4:

The first muting SRS transmission within a SRS muting periodicity can be determined according to an muting offset parameter. The muting offset parameter can be a value from 0~(the SRS muting periodicity-1), the M muting SRS transmission can be continuous SRS occasions, or not continuous but every 2 muting SRS transmissions are 2 SRS occasions with a SRS count interval of a predefined value or a configured value. The SRS muting periodicity is indicated to the UE.

Scheme 2.5: In case 5, SRS muting happens on partial bands of the hopping level (the last level, or the highest indexed level). The hopping level is configured by gNB to UE, e.g., $B_{SRS}$.

There are $N_{B_{SRS}}F_0/F$ hopping units are muted in each $N_{B_{SRS}}$ hopping units, wherein F is an integer which is larger than 1, and $F_0$ is an integer which is equal to or larger than 1 and less than or equal to F. $F_0$ or F can be predefined value or configured or indicated by gNB to UE.

$F_0$ hopping units can be continuous logically or not continuous. As shown in FIG. 3, case 5, $B_{SRS}=3$, $N_{B_{SRS}}=2$.

Scheme 2.6: In case 6 in FIG. 3, SRS muting happens on partial bands of a muting level which is other than the hopping level (the last level, or the highest indexed level). The muting level may be a level with index which is one or more less than the hopping level, e.g., $B_{SRS}-1$ (if $B_{SRS}-1>=0$), or $B_{SRS}-2$ (if $B_{SRS}-2>=0$). The muting level can be predefined as $B_{SRS}-1$ or $B_{SRS}-2$, or the muting level can be configured by gNB to UE. For example, as shown in case 6, a UE is configured $B_{SRS}=3$ for SRS frequency hopping, the hopping level is 3, muting level can be 2. The UE transmits SRS transmission with hopping pattern with $B_{SRS}$=3, but determines SRS muting pattern using muting level 2. One shaded block in level 2 corresponds to two shaded blocks in level 3. The shaded blocks in level 3 are muted.

III. Frequency Hopping

Introduction:

The frequency-domain starting position $$k_0^{(p_i)}$$

is defined by $$k_0^{(p_i)} = \bar{k}_0^{(p_i)} + n_{offset}^{FH} + n_{offset}^{RPFS}$$

where

The first part of the right side of the above equation corresponds to a starting position for a frequency hopping pattern (or a frequency hopping tree, or a frequency hopping root, or a first level of the frequency hopping tree) considering comb offset for an SRS transmission. This part depends on parameter $n_{shift}$ which is the frequency domain shift value adjusting the SRS allocation with respect to the reference point grid, and comb parameter for the SRS transmission.

Figure 4:
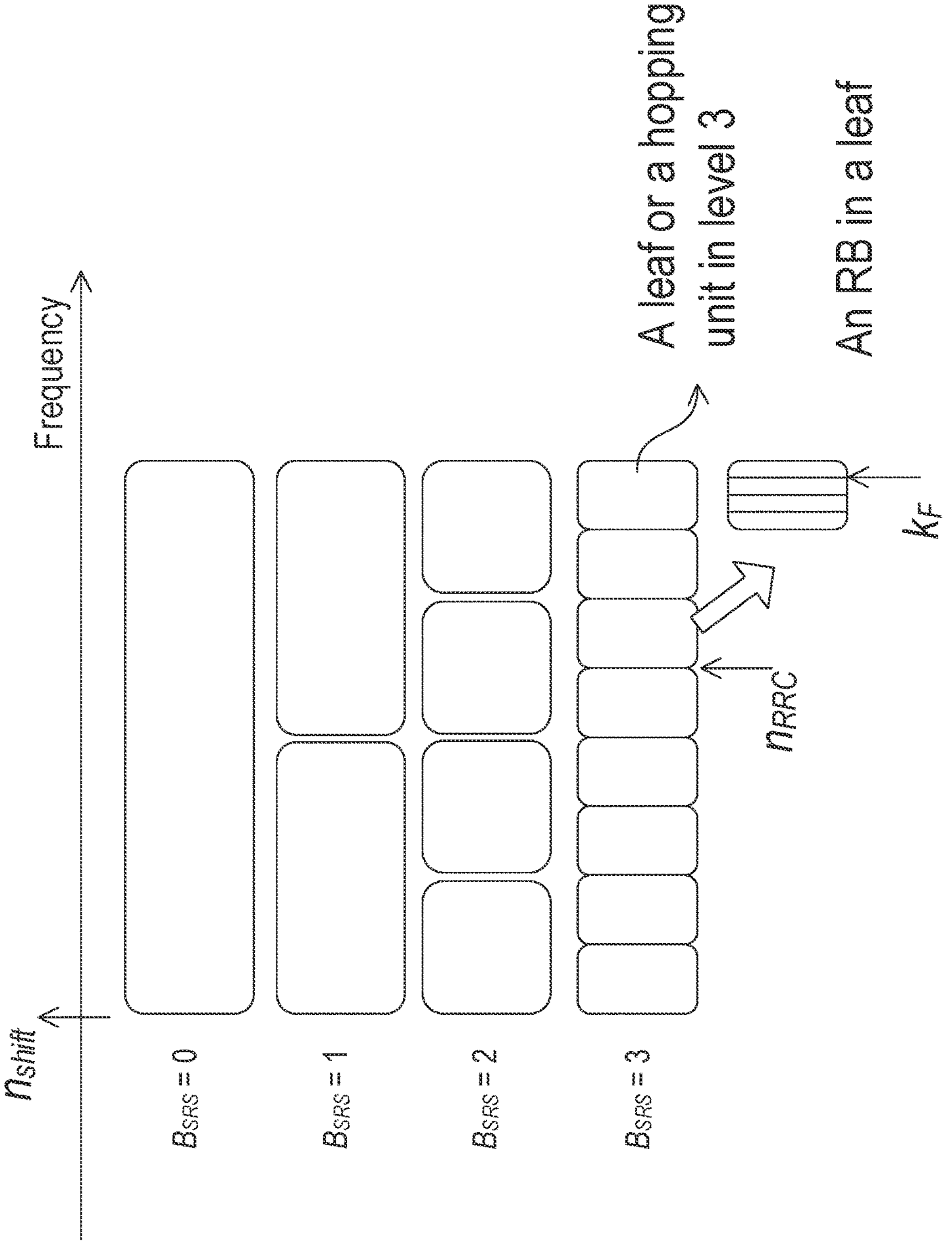
FIG. 4 shows an example of a leaf or a hopping unit.

The second part of the right side of the above equation corresponds to a position offset of a leaf with index of $n_b$ for a hopping level b (a leaf with index of $n_b$ for a hopping level b represents a frequency hopping unit with index of $n_b$ for a hopping level b, determined by a frequency domain position parameter $n_{RRC}$ which is provided by the higher-layer parameter freqDomainPosition if configured, otherwise $n_{RRC}$=0) relative to a starting position for a frequency hopping pattern.

$$\bar{k}_0^{(p_i)} = n_{shift} N_{sc}^{RB} + \left(k_{TC}^{(p_i)} + k_{offset}^{l'}\right) \bmod K_{TC} k_{TC}^{(p_i)} =$$

$$\begin{cases} \left(\bar{k}_{TC} + K_{TC}/2\right) \bmod K_{TC} & \text{if } N_{ap}^{SRS} = 4,\ p_i \in \{1001, 1003\}, \text{ and } n_{SRS}^{cs,max} = 6 \\ \left(\bar{k}_{TC} + K_{TC}/2\right) \bmod K_{TC} & \text{if } N_{ap}^{SRS} = 4,\ p_i \in \{1001, 1003\}, \text{ and } n_{SRS}^{cs} \in \{n_{SRS}^{cs,max}/2, \ldots, n_{SRS}^{cs,max} - 1\} \\ \bar{k}_{TC} & \text{otherwise} \end{cases}$$

$$n_{offset}^{FH} = \sum_{b=0}^{B_{SRS}} m_{SRS,b} N_{sc}^{RB} n_b$$

$$n_{offset}^{RPFS} = N_{sc}^{RB} m_{SRS,B_{SRS}} \left((k_F + k_{hop}) \bmod P_F\right) / P_F$$

and $k_F \in \{0, 1, \ldots, P_F-1\}$ is given by the higher-layer parameter StartRBIndex if configured, otherwise $k_F$=0;

FIG. 4 shows an example of a leaf or a hopping unit (or a frequency hopping unit) of $B_{SRS}$ level of 3 having a plurality of resource blocks, where $k_F$ indicates a starting resource block position in the leaf. $P_F$ indicates a number of resource block parts in one leaf.

$k_{hop}$ is given by Table 6.4.1.4.3-3 with $$\bar{k}_{hop} = \left\lfloor \frac{n_{SRS}}{\prod_{b'=b_{hop}}^{B_{SRS}} N_{b'}} \right\rfloor \bmod P_F$$

$$N_{b_{hop}} = 1$$

if the higher-layer parameter EnableStartRBHopping is configured, otherwise $k_{hop}$=0.

TABLE 6.4.1.4.3-3

The quantity $k_{hop}$ as a function of $\bar{k}_{hop}$.

| | $k_{hop}$ | | |
|---|---|---|---|
| $\bar{k}_{hop}$ | $P_F = 1$ | $P_F = 2$ | $P_F = 4$ |
| 0 | 0 | 0 | 0 |
| 1 | — | 1 | 2 |
| 2 | — | — | 1 |
| 3 | — | — | 3 |

The third part of the right side of the above equation corresponds to a position offset of an RB in a leaf with index of $n_b$ for a hopping level b. The RB is determined by $k_F$ which is StartRBIndex.

Issue 2: RB level starting position can be hopped with $n_{SRS}$. But the hopping is not flexible enough. A RB level hopping index is not changed in a continuous $$\prod_{b'=b_{hop}}^{B_{SRS}} N_{b'}$$

SRS occasions.

Solutions:

A RB level hopping index can be determined by a scaling factor S. For example, $$\bar{k}_{hop} = \left\lfloor \frac{n_{SRS}/S}{\prod_{b'=b_{hop}}^{B_{SRS}} N_{b'}} \right\rfloor \bmod P_F$$

where S can be a integer value of $\{1, 2, \ldots, P_F\}$. S can be a predefined value or configured or indicated by gNB to a UE. One of the technical benefits of the equation $$\bar{k}_{hop} = \left\lfloor \frac{n_{SRS}/S}{\prod_{b'=b_{hop}}^{B_{SRS}} N_{b'}} \right\rfloor \bmod P_F$$

is that it allows the UE to change $\bar{k}_{hop}$ more frequently.

For example, assuming S=2, a RB level hopping index is not changed in a continuous half of $$\prod_{b'=b_{hop}}^{B_{SRS}} N_{b'}$$

SRS occasions. Assuming $S=P_F$, a RB level hopping index is changed every SRS occasion.

Issue 3: the leaf hopping is determined by $n_{RRC}$. If two UEs are configured with same leaf in a same level for SRS hopping, the SRS resources collide with each other all the time.

Solution 3.1: Starting position of a leaf could be updated dynamically.

A frequency domain position parameter can be updated every X SRS occasions. The frequency domain position parameter is used to determine starting position (i.e., $k_F$) for a leaf in a hopping level.

X can be $$\prod_{b'=b_{hop}}^{B_{SRS}} N_{b'}$$

where $B_{SRS}$ is 3, or the $B_{SRS}$ is a hopping level, e.g., configured by gNB to UE.

A frequency domain position parameter can be updated to a parameter, e.g., $n'_{RRC}$, according to a UE specific ID, e.g., C-RNTI, or a SRS sequence identity, or SRS resource related ID (such as SRS resource ID in a SRS resource set, SRS burst ID, SRS resource set ID, SRS group ID), and/or a time domain related value.

For example, $n'_{RRC}$ is a function of $n_{RRC}$ and the UE specific ID. E.g., $n'_{RRC}=n_{RRC}+ID_{UE\_specific}$ Or $4*n'_{RRC}=4*n_{RRC}+ID_{UE\_specific}$ The time domain related value can be determined according to $n_{SRS}$, subframe index, slot index, or symbol index of SRS transmission.

Solution 3.2: Starting position of a root of a frequency hopping pattern could be updated dynamically.

A frequency domain shift parameter can be updated every X SRS occasions. The frequency domain shift parameter is used to determine starting position for a leaf in a hopping level.

X can be $$\prod_{b'=b_{hop}}^{B_{SRS}} N_{b'}$$

where $B_{SRS}$ is 3, or the $B_{SRS}$ is a hopping level, e.g., configured by gNB to UE.

A frequency domain shift parameter can be updated to a parameter, e.g., $n'_{shift}$, according to a UE specific ID, e.g., C-RNTI, or a SRS sequence identity, or SRS resource related ID (such as SRS resource ID in a SRS resource set, SRS burst ID, SRS resource set ID, SRS group ID) and/or a time domain related value.

For example, $n'_{shift}$ is a function of $n_{shift}$ and the UE specific ID. E.g., $n'_{shift}=n_{shift}+ID_{UE\_specific}$.

The time domain related value can be determined according to $n_{SRS}$, subframe index, slot index, or symbol index of SRS transmission.

Frequency Hopping for CJT

Considering co-phase of TRPs may vary at different time points, time-domain gap between two SRS transmissions corresponding to different TRPs with CJT occupying the same frequency-domain range(s), e.g., RBs or REs, should be not be larger than a threshold. The threshold may be one or more slots, one or more subframes or frames. This can ensure a relatively fixed co-phase of CJT between TRPs.

For example, the frequency hopping parameter can be configured per SRS resource set. A SRS resource in the SRS resource set corresponds to a TRP. The frequency hopping parameter is based on SRS resource ID.

Frequency Hopping for 8 SRS Ports

In order to support 8Tx uplink transmission, SRS resource can be configured 8 SRS ports. If the 8 SRS ports are on a same OFDM symbol, the frequency hopping scheme can be reused.

If the 8 SRS ports are on different OFDM symbols, e.g., 2 symbols, some rules may be needed.

Figure 5:
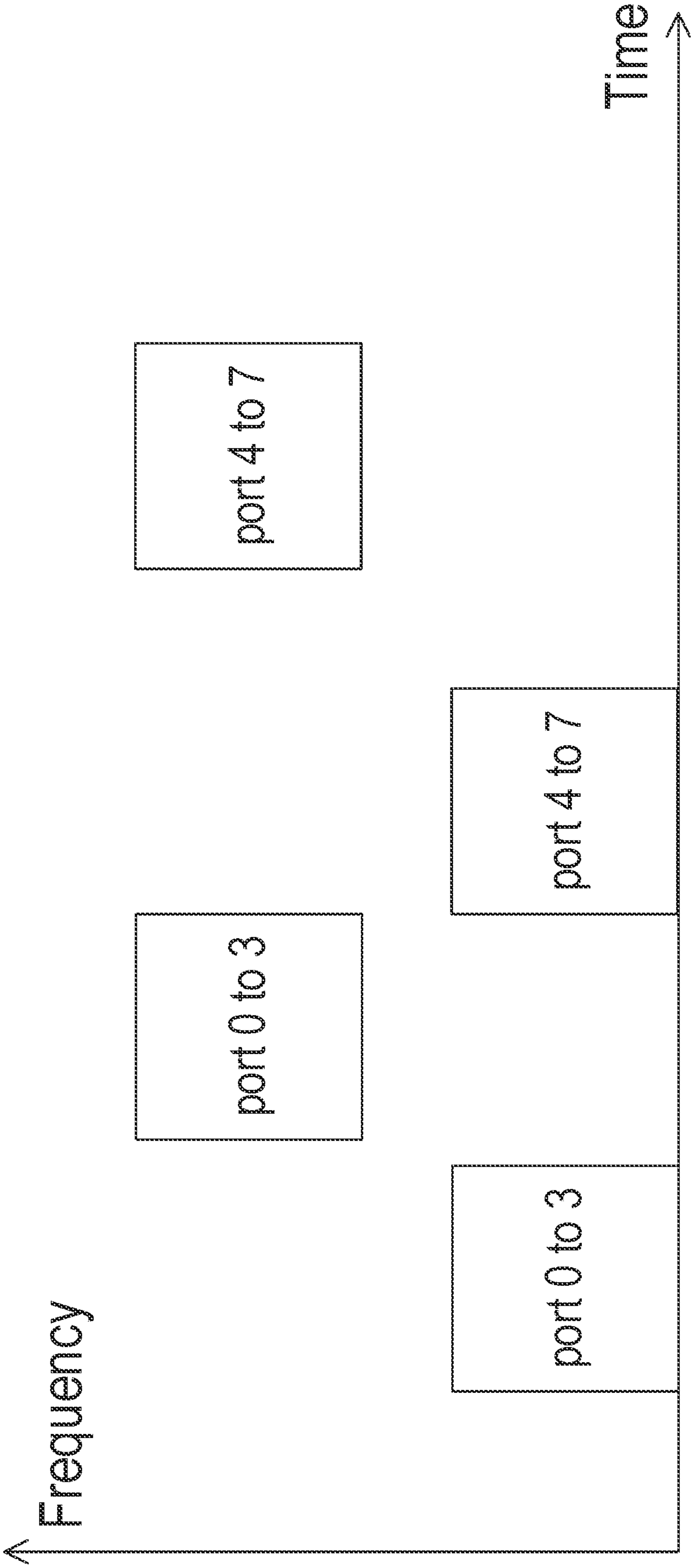
FIG. 5 shows transmissions using different symbols in different ports.

For example, 8 SRS ports are divided into 2 port groups, each port group corresponding to one OFDM symbol. The different OFDM symbols, e.g., N symbols, are divided to two groups. Each symbol group corresponds to one SRS port group. The symbol in one symbol group should be consecutive. The symbols in different symbol groups can be consecutive or non-consecutive. The different symbol groups should be fully overlapped or non-overlapped, cannot be partially overlapped. If they are partially overlapped, the numbers of transmitted SRS ports on different symbols are different, then the power of different ports may be different. The different symbol groups should include same number of SRS ports. FIG. 5 shows transmissions using different symbols in different ports.

Further, if the 8 SRS ports are supported by more than one SRS resource, at least one of the following rules may be needed: the more than one resource can be in one slot or in consecutive two slots; the hopping bandwidth for different resources can be same; the hopping parameter can be configured per SRS resource set; or the start PRB index can be based on SRS resource ID in the SRS set.

IV. TRP Common SRS or TRP Specific SRS

Introduction:

In coherent joint transmission (CJT) scenario, a SRS is transmitted by a UE, and one or more CJT TRPs receive and measure the SRS. If a SRS is intended for more than one TRP, the SRS is TRP common SRS. If a SRS is intended for one TRP, the SRS is TRP specific SRS.

Issue 4: power control schemes for TRP common SRS or TRP specific SRS need to be specified.

Solution 4:

For TRP Common SRS:

One SRS is used by multiple CJT TRPs. The pathloss value for determining transmit power of SRS should be determined according to one or more RS (e.g., SSB, or CSI-RS) corresponding to one or more CJT TRPs.

One SRS resource or one SRS resource set can be associated with one or more RS corresponding to one or more TRPs. UE determines one or more pathloss values related to the one or more RS, and apply the maximum pathloss value to determine transmit power of the SRS resource, or the SRS resources in the SRS resource set. It can make sure all TRPs receive the SRS with good enough quality, in another word, with high enough received power.

Figure 6:
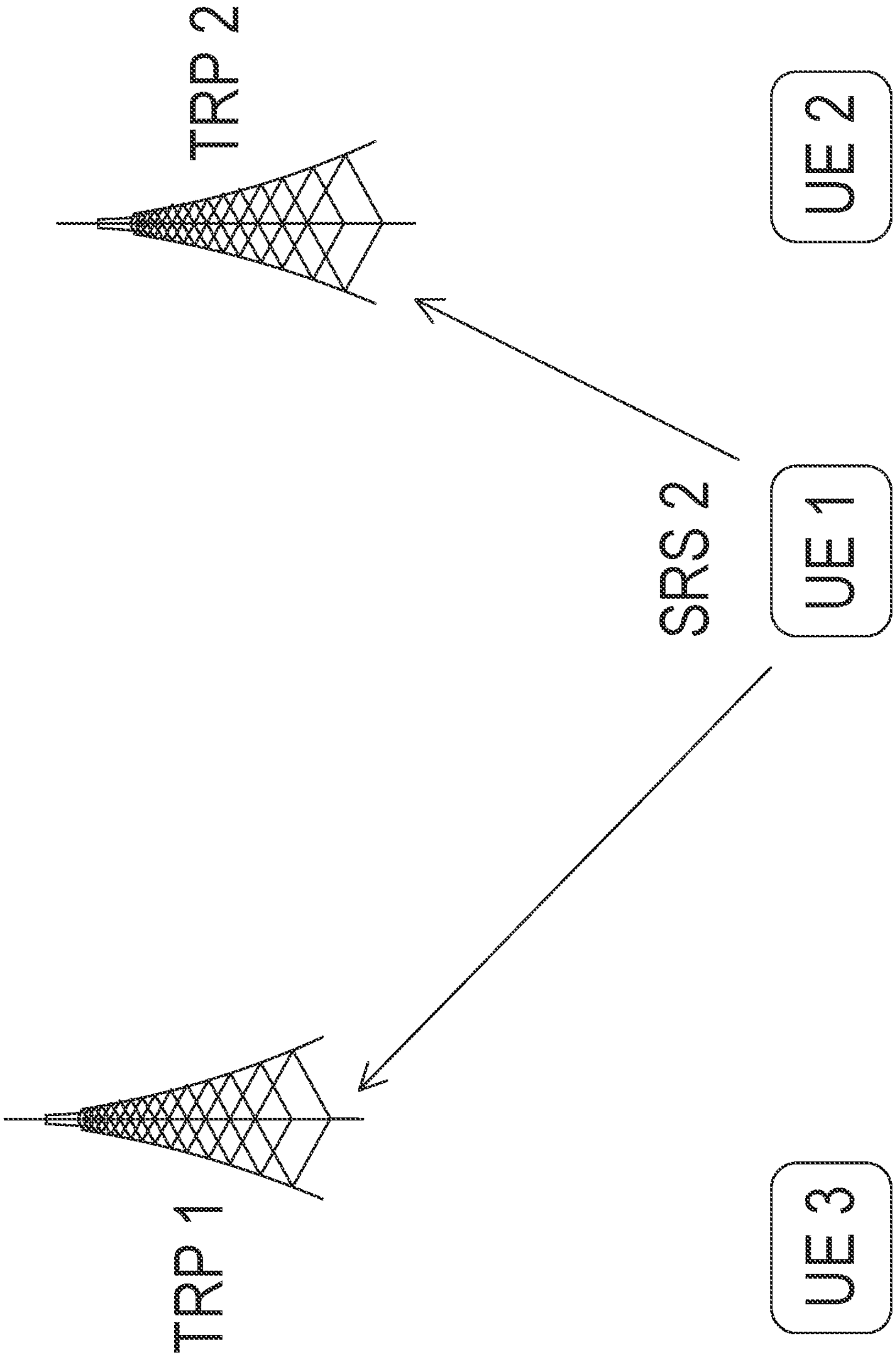
FIG. 6 shows a transmission of sounding reference signal 2 (SRS2) to two TRPs.

For example, the SRS2 is used by TRP1 and TRP2 as shown in FIG. 6, the path-loss based on CSI-RS of TRP1 which is larger than the pathloss based on CSI-RS of TRP2 is applied to determine transmit power of SRS 2.

In summary, path-loss for a SRS is determined by a predefined rule, e.g., maximum/average path-loss from a set of candidate PL-RS(s). Each path-loss RS is TRP specific.

Transmit power of a SRS is determined by a predefined rule, e.g., with objective of maximizing Tx power among TRP/beam-specific Tx power. Power control parameter setting is TRP specific.

For TRP Specific SRS:

A UE transmits N SRS resources each of which targets one of N CJT TRPs. The timing and transmit power is controlled for each SRS resources considering the corresponding TRP.

Issue 5: From perspective of gNB, the power and time difference between UEs at one TRP can be eliminated, but the transmit power of N SRS resources in N CJT TRPs are different. It will impact CJT CSI obtained by the multiple TRPs.

Solution 5:

2.1: UE can report ratio or difference of transmit power between SRS resources for different TRPs.

The TRP comprises at least one of "information grouping one or more reference signals", "PUCCH resource set", "reference signal resource set", "panel related information", "sub-array", "antenna group", "antenna port group", "group of antenna ports", "beam group", "physical cell index(PCI)", "TRP related information", "CORESET pool index", candidate cell, candidate cell group, time alignment group (TAG), a set of power control parameter, index of TCI state in a TCI state codepoint, "UE capability value" or "UE capability set".

Alt1: One SRS set is for CJT and each SRS resource in the set corresponding to one TRP. Different SRS resources are associated with same open loop power control parameter (e.g., target receiving power, such as P0, factor of PL compensation, such as alpha), closed loop power control parameter (e.g., CLPC ID, or number of closed loop power control loops) and respective path-loss RS (i.e., PL-RS used to evaluate pathloss), or different SRS resources are associated with respective open loop power control parameter, closed loop power control parameter and path-loss RS. The UE reports ratio of SRS transmission power between SRS resources for different TRPs. The reference SRS resource for the ratio can be reported by UE, or the reference SRS resource is indicated by gNB, or the reference SRS resource is with a predefined index, e.g., lowest or highest SRS resource ID in the SRS resource set, or the lowest/highest SRS resources ID associated with a TRP with lowest (or highest) TRP ID in the SRS resource set. The antenna ports in each SRS resource in the one SRS resource set are same. The SRS resources in one SRS resource set is TDMed.

Alt2: One SRS resource with multiple bursts and each burst with one respective power control parameter. Each burst corresponds to one TRP and one respective power control parameter. The UE reports ratio of SRS transmission power between SRS bursts for different TRPs. The reference SRS burst should be determined by UE and reported to gNB, or the reference SRS burst is indicated by gNB, or the reference SRS resource burst is with a predefined index, e.g., first or last SRS resource burst of the SRS resource, or first or last SRS resource burst associated with a TRP with lowest (or highest) TRP ID.

Alt3: One or more SRS resource sets in a SRS group are for antenna switching. Multiple SRS groups are for CJT. Each SRS group corresponds to one TRP. The one or more SRS resource sets correspond to SRS ports for antenna switching with xTyR (x transmitting ports, y receiving ports), especially for the case where x is smaller than y. Each SRS group corresponds to one respective set of power control parameters. The UE reports ratio of SRS transmit power between SRS groups for different TRPs. The reference SRS group should be determined by UE and reported to gNB, or the reference SRS group is indicated by gNB, or the reference SRS group is with a predefined index, e.g., first or last SRS group, or lowest (or highest) ID associated with a TRP with lowest (or highest) TRP ID. The UE antenna ports from different SRS groups but with same SRS resource ID and same SRS resources set ID are same.

Alt1 and Alt2 are suitable for xTxR and Alt 3 is suitable for xTyR especially for the case where x is smaller than y. Of course, the Alt 3 is also suitable for xTxR case.

2.2: UE transmits SRS resources with same transmit power. Each SRS resource can be determined a transmit power value, and a common transmit power value, e.g., the maximum transmit power among the transmit power values of the SRS resources corresponding to multiple TRPs, is determined for transmit power of each of the SRS resource.

SRS configuration for CJT:

Assuming TRP1 and TRP2 are CJT TRPs, a UE is configured, e.g., by gNB, a SRS pool 1 for TRP1, and a SRS pool 2 for TRP2. For TRP1 and TRP2 common SRS pool can be at least one of following:

Opt1: a SRS pool with SRS resource orthogonal with SRS resource in SRS pool 1, or in SRS pool 2.

Opt2: a SRS pool with SRS resource in SRS pool 1, or in SRS pool 2, with interference randomization.

Opt3: a SRS pool with SRS resource in SRS pool 1, or in SRS pool 2, with dynamic changing parameters, such as frequency hopping parameters.

If there are more than two CJT TRPs, a common SRS pool can be configured for each pair of CJT TRPs, or for all CJT TRPs.

This patent document describes several technical solutions, which include:

- For SRS muting scheme: determine muting pattern based on frequency hopping pattern, muting periodicity, muting offset and muting resource.
- For frequency hopping, RB level hopping index can be determined by a scaling factor S; frequency domain position parameter $n_{RRC}$, and frequency domain shift parameter $n_{shift}$ can be used as an dynamic updated value every X SRS occasions.
- Power control schemes for TRP common SRS or TRP specific SRS. UE can report ratio or difference of transmit power between SRS resources for different TRPs.

Figure 7:
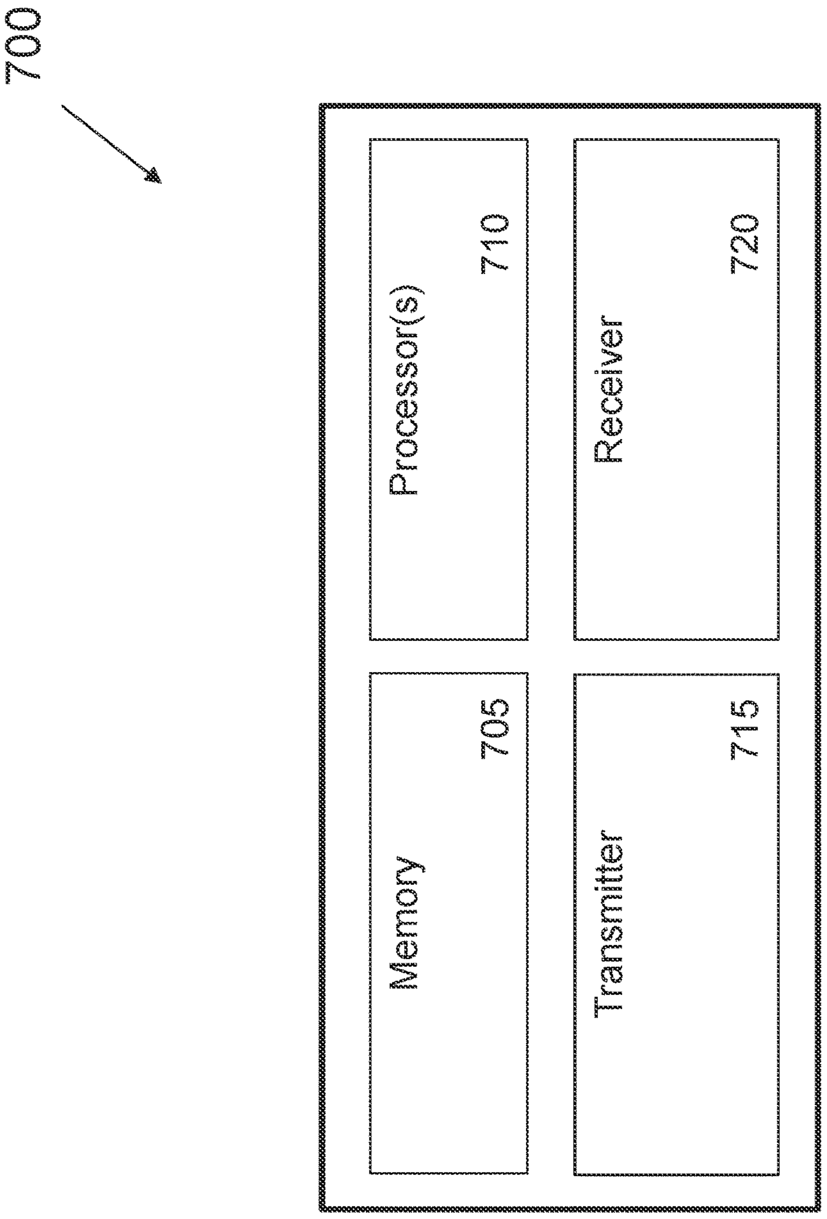
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 700 to perform the operations described in FIGS. 1 to 6 and 8 to 15 and in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

Figure 8:
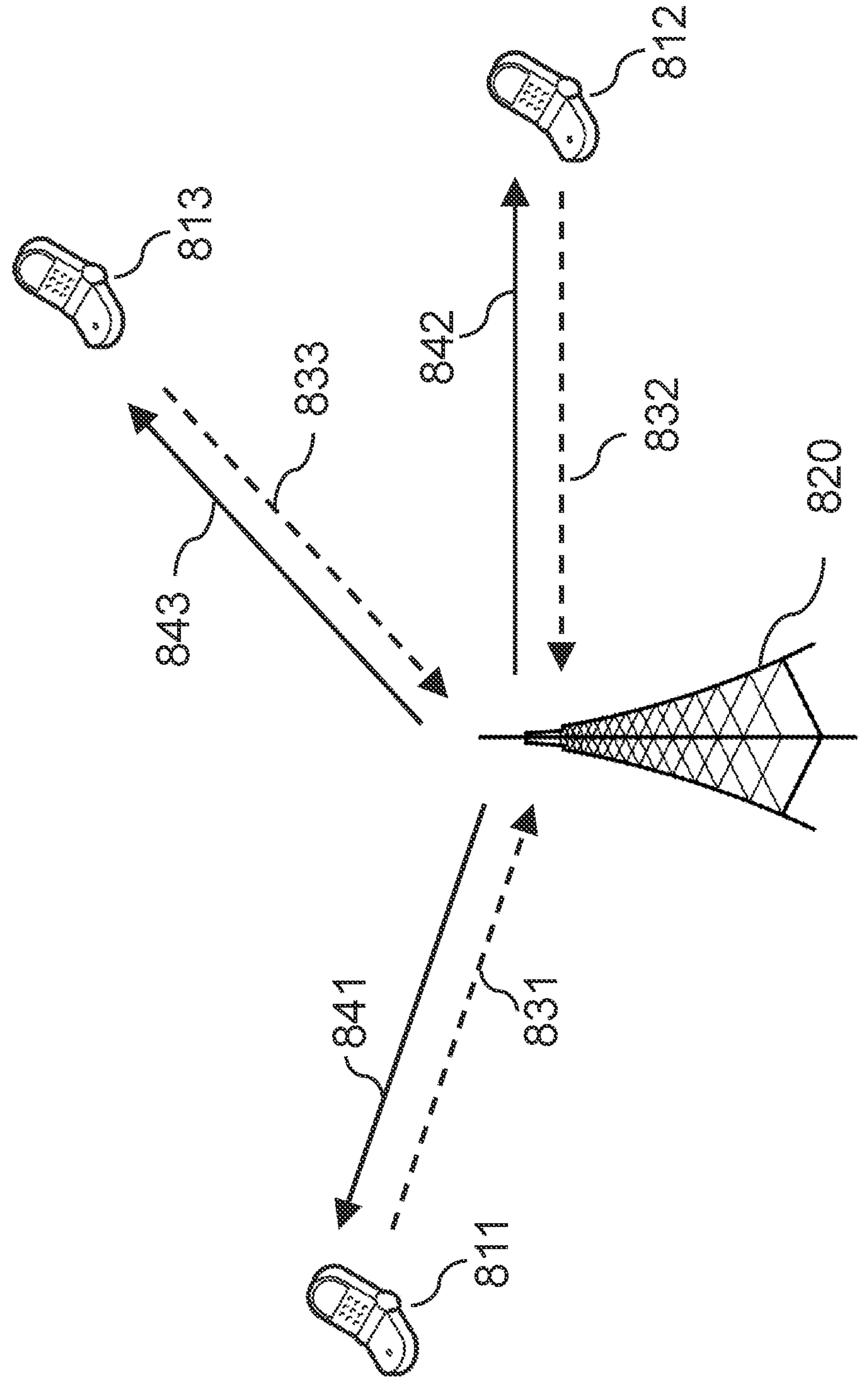
FIG. 8 shows an example of wireless communication including a base station (BS) and user equipment (UE) based on some implementations of the disclosed technology.

The implementations as discussed above will apply to a wireless communication. FIG. 8 shows an example of a wireless communication system (e.g., a 5G or NR cellular network) that includes a base station 820 and one or more user equipment (UE) 811, 812 and 813. In some embodiments, the UEs access the BS (e.g., the network) using a communication link to the network (sometimes called uplink direction, as depicted by dashed arrows 831, 832, 833), which then enables subsequent communication (e.g., shown in the direction from the network to the UEs, sometimes called downlink direction, shown by arrows 841, 842, 843) from the BS to the UEs. In some embodiments, the BS send information to the UEs (sometimes called downlink direction, as depicted by arrows 841, 842, 843), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

Figure 9:
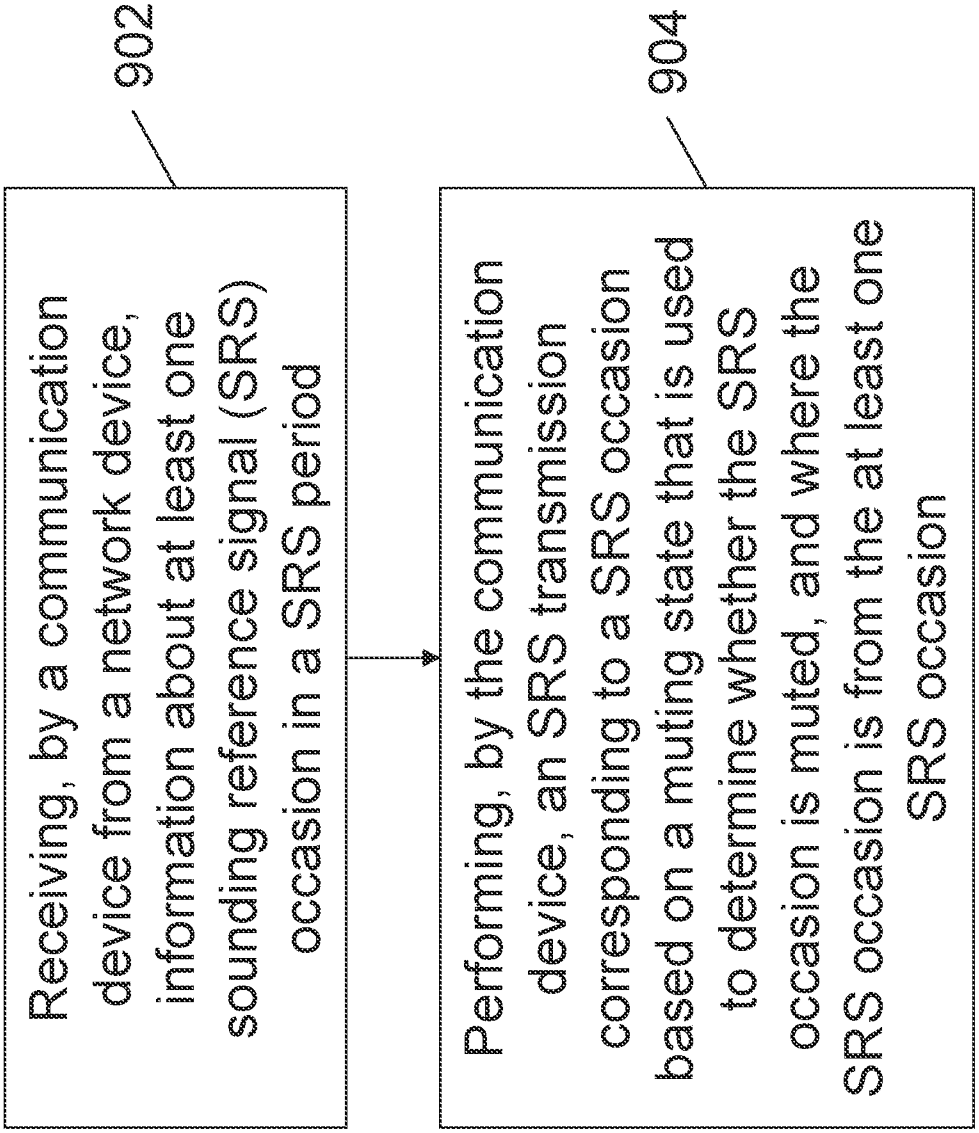

FIG. 9 shows an exemplary flowchart for performing a SRS transmission. Operation 902 includes receiving, by a communication device from a network device, information about at least one sounding reference signal (SRS) occasion in a SRS period. Operation 904 includes performing, by the communication device, an SRS transmission corresponding to a SRS occasion based on a muting state that is used to determine whether the SRS occasion is muted, and where the SRS occasion is from the at least one SRS occasion.

In some embodiments, the muting state for the SRS occasion is determined based on any one or more of: a muting period that comprises a number of $T_{muting\text{-}period}$ SRS occasions, a muting offset that comprises a number of $T_{muting\text{-}offset}$ SRS occasions, a muting unit, a muting interval that comprises a number of $T_{muting\text{-}interval}$ SRS occasions, a parameter of frequency hopping, a parameter of SRS period, and/or a parameter for randomization. In some embodiments, the parameter of frequency hopping may comprise the frequency domain starting position or the frequency hopping period, or the parameter to determine the frequency domain starting position, or frequency hopping period, such as $b_{hop}$, $n_{SRS}$, $b_{hop}$ etc. In some embodiments, the parameter of SRS period may comprise a time domain starting position, a frequency domain starting position, or a number of SRS occasions in a SRS period, or the parameter to determine a SRS period, a time domain starting position, a frequency domain starting position, or a number of SRS occasions in a SRS period. In some embodiments, the parameter of randomization may comprise a random sequence, or parameter to generate a pseudo-random sequence. E.g., the initial seed of this random sequence can be same as that for group hopping SRS sequence generation.

In some embodiments, the number $T_{muting\text{-}period}$ is determined according to: a configured or a predetermined integer value, a value based on a hopping period which comprises a number of $T_{hopping\text{-}period}$ SRS occasions, a value based on the SRS period which comprises a number of $T_{SRS\text{-}period}$ SRS occasions, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period. For example, a randomized value noted as x, can be determined as one of following formulas:

$$x(n_{SRS}) = c(n_{SRS}), \text{ or}$$

$$x\left(n_{s,f}^{\mu}\right) = \left(\sum_{m=0}^{N_0-1} c(N_0 \cdot n_{SRS} + m) \cdot 2^m\right) \bmod Y, \text{ or}$$

$$x\left(n_{SRS}, n_{s,f}^{\mu}\right) = \left(\sum_{m=0}^{N_0-1} c\left(N_0 \cdot n_{s,f}^{\mu} N_{symb}^{slot} + n_{SRS} + m\right) \cdot 2^m\right) \bmod Y$$

where Y is determined as a predetermined value, such as 30, or according to $T_{muting\text{-}period}$. E.g., $Y=T_{muting\text{-}period}$. Where $N_0 \trianglelefteq \lfloor \log_2(Y) \rfloor$, or $N_0$ is a predetermined as a value of power of i-th power of 2, such as 8, 16, etc.

$$n_{s,f}^{\mu}$$

Slot number within a frame for subcarrier spacing configuration μ;

$$N_{symb}^{slot}$$

Number of symbols per slot.

where the pseudo-random sequence c(i) is defined as following and shall be initialized with $$c_{init} = n_{ID}^{SRS}$$

at the beginning of each $T_{muting\text{-}period}$.

Generic pseudo-random sequences are defined by a length-31 Gold sequence. The output sequence c(n) of length $M_{PN}$, where n=0, 1, . . . , $M_{PN}-1$, is defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C=1600$ and the first m-sequence $x_1(n)$ shall be initialized with $x_1(0)=1$, $x_1(n)=0$, n=1, 2, . . . , 30. The initialization of the second m-sequence, $x_2(n)$, is denoted by $$c_{init} = \sum_{i=0}^{30} x_2(i) \cdot 2^i$$

with the value depending on the application of the sequence.

The quantity $n_{SRS}$ counts the number of SRS transmissions. $n_{SRS}$ is index of SRS occasion and can also be replaced by $\lfloor n_{SRS}/T_{muting\text{-}period} \rfloor$ in above formulas. For the case of an SRS resource configured as aperiodic, it is given by $n_{SRS}=\lfloor l'/R \rfloor$ within the slot in which the $$N_{symb}^{SRS}$$

symbol SRS resource is transmitted. For the case of an SRS resource configured as periodic or semi-persistent, the SRS counter is given by $$n_{SRS} = \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor$$

for slots that satisfy $$(N_{slot}^{frame,\mu} n_f + n_{s,f}^{\mu} - T_{offset}) \bmod T_{SRS} = 0.$$

The quantity $$R \le N_{symb}^{SRS}$$

is the repetition factor given by the field repetitionFactor if configured, otherwise $$R = N_{symb}^{SRS}.$$

$$n_{SRS} = \left(\frac{N_{slot}^{frame,\mu} n_f + n_{s,f}^{\mu} - T_{offset}}{T_{SRS}}\right) \cdot \left(\frac{N_{symb}^{slot}}{R}\right) + \left\lfloor \frac{l'}{R} \right\rfloor$$

where $$N_{symb}^{slot}$$

is the number of symbols in a slot, e.g., 14. 1" is symbol index of symbol of SRS transmission from 0 to $$N_{symb}^{slot} - 1.$$

The input of function c( ) can also be related to frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period.

In some embodiments, the value based on the hopping period $T_{hopping\text{-}period}$ comprises L0*$T_{hopping\text{-}period}$, wherein L0 is an integer or a fraction, and/or wherein the value based on the SRS period $T_{SRS\text{-}period}$ comprises L1*$T_{SRS\text{-}period}$, wherein L1 is an integer or a fraction. In some embodiments, the muting offset value $T_{muting\text{-}offset}$ is determined according to any one or more of: a configured or a predetermined integer value, a value based on a hopping period which comprises a number of $T_{hopping\text{-}period}$ SRS occasions, a value based on an SRS period which comprises a number of $T_{SRS\text{-}period}$ SRS occasions, a value determined based on frequency domain or time domain starting position of a hopping period, or a first SRS occasion position in a hopping period, a value determined based on frequency domain or time domain starting position of a SRS period, or a first SRS occasion position in a SRS period, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period.

In some embodiments, the value based on the hopping period $T_{hopping\text{-}period}$ comprises L2*$T_{hopping\text{-}period}$, wherein L2 is an integer or a fraction, and/or the value based on the SRS period $T_{SRS\text{-}period}$ comprises L3*$T_{SRS\text{-}period}$, wherein L3 is an integer or a fraction. In some embodiments, the muting period comprises a number of N muting units, or the muting unit comprises the SRS occasion, the SRS period, a hopping period, a fraction of the SRS period, or a fraction of the hopping period. In some embodiments, the muting is described from perspective of an SRS occasion. In some embodiments, the muting SRS occasions can be distributed in a muting period. For example, muting SRS occasions can be non-consecutive, with an interval, or a group (e.g., muting unit (e.g., a SRS period, a hopping period)) of muting SRS occasions can be consecutive. In some embodiments, different groups can be non-consecutive. In some embodiments, fraction of SRS period can mean the group of consecutive SRS occasions only refer to part of SRS occasions in a SRS period. For fraction of SRS period, the determined muting SRS occasions can also be non-consecutive. This can be a similar case for fraction of hopping period.

In some embodiments, the muting state of the SRS occasion which belongs to the N SRS muting units is determined as muted, or the muting state of the SRS occasion which does not belong to the N SRS muting units is determined as non-muted. In some embodiments, the number N is determined according to any one or more of: a configured or a predetermined integer value or a fraction value, or a value determined according to the muting period and the muting interval. For example, N can be determined by a floor of (value of muting period/value of muting interval.

In some embodiments, the N muting units within the muting period are determined according to any one or more of: a first muting unit is determined by the muting offset value based on beginning of the muting period, one or more subsequent SRS muting units other than the first SRS muting unit are determined according to the muting interval, or the N muting units are consecutive or non-consecutive. The N muting units within the muting period can be determined by a first muting unit based on a muting offset value, and subsequent muting units with a muting interval. Or the N muting units within the muting period can be determined by a set of first muting units based on a set of muting offset values, and subsequent muting units for each of the set of first muting units can be determined with a same or a perspective muting interval. For each of a set of muting units, a respective muting offset is determined, the muting offset can be an absolute or accumulated value. For example, a set of muting units include 3 muting units, and 3 muting offsets are determined as Z0, Z1, Z2 for each muting unit, then the SRS muting units are determined as s+Z0, s+Z1, s+Z2, or as s+Z0, s+Z0+Z1, s+Z0+Z1+Z2. wherein s is the starting SRS occasion counts for a SRS muting period. Muting offset can be random value, to avoid multiple SRS muting units are too close, a predetermined or a configured value K can be used. Such as s+K+Z0, s+2K+Z0+Z1, s+3K+Z0+Z1+Z2 for accumulated scheme, or s+K+Z0, s+K+Z1, s+K+Z2.

In some embodiments, the N muting units are determined based on a hopping pattern of a hopping level, the hopping level is a level configured for the communication device, the hopping level is a level other than the configured level for the communication device, or the hopping pattern of the hopping level comprises at least one frequency hopping position for at least one frequency hopping unit in an predetermined order for at least one SRS occasion. In some embodiments, one or more certain frequency hopping units are determined as for muting SRS occasions. In some embodiments, the muting interval $T_{muting\text{-}interval}$ is determined based on any one or more of: a configured or a predetermined integer value, a value based on a hopping period which comprises a number of $T_{hopping\text{-}period}$ SRS occasions, a value based on an SRS period which comprises a number of $T_{SRS\text{-}period}$ SRS occasions, and/or a randomized value based on at least one of SRS occasion index, frame index, subframe index, slot index or symbol index of SRS transmission, a muting period $T_{muting\text{-}period}$, numerology value or subcarrier space related parameter, a number of random muting offset values for one muting period, or an index of random muting offset values for one muting period. In some embodiments, the value based on the hopping period $T_{hopping\text{-}period}$ comprises $L4*T_{hopping\text{-}period}$, wherein L4 is an integer or a fraction, or the value based on the SRS period $T_{SRS\text{-}period}$ comprises $L5*T_{SRS\text{-}period}$, wherein L5 is an integer or a fraction.

FIG. 10 shows another exemplary flowchart for performing a SRS transmission. Operation 1002 includes performing, by a communication device, a second sounding reference signal (SRS) transmission in response to a muting of a first SRS transmission in a first time period, where each of a plurality of time periods or each of a plurality of SRS transmissions is associated with one frequency hopping pattern, and where a frequency hopping pattern period includes the plurality of time periods configured for the plurality of SRS transmissions.

In some embodiments, the second SRS transmission is performed in a second time period using a frequency hopping pattern associated with the first time period where the first SRS transmission is muted, and the frequency hopping pattern indicates a frequency location where the second SRS transmission is performed. In some embodiments, the frequency hopping pattern period includes the first time period and the second time period. In some embodiments, the second SRS transmission is performed in the first time period using a frequency hopping pattern associated with the second time period, and the frequency hopping pattern indicates a frequency location where the second SRS transmission is performed. In some embodiments, the communication device does not perform the first SRS transmission in the first time period in the frequency hopping pattern period associated with the first time period, or wherein the frequency hopping pattern period includes the second time period.

Figure 11:
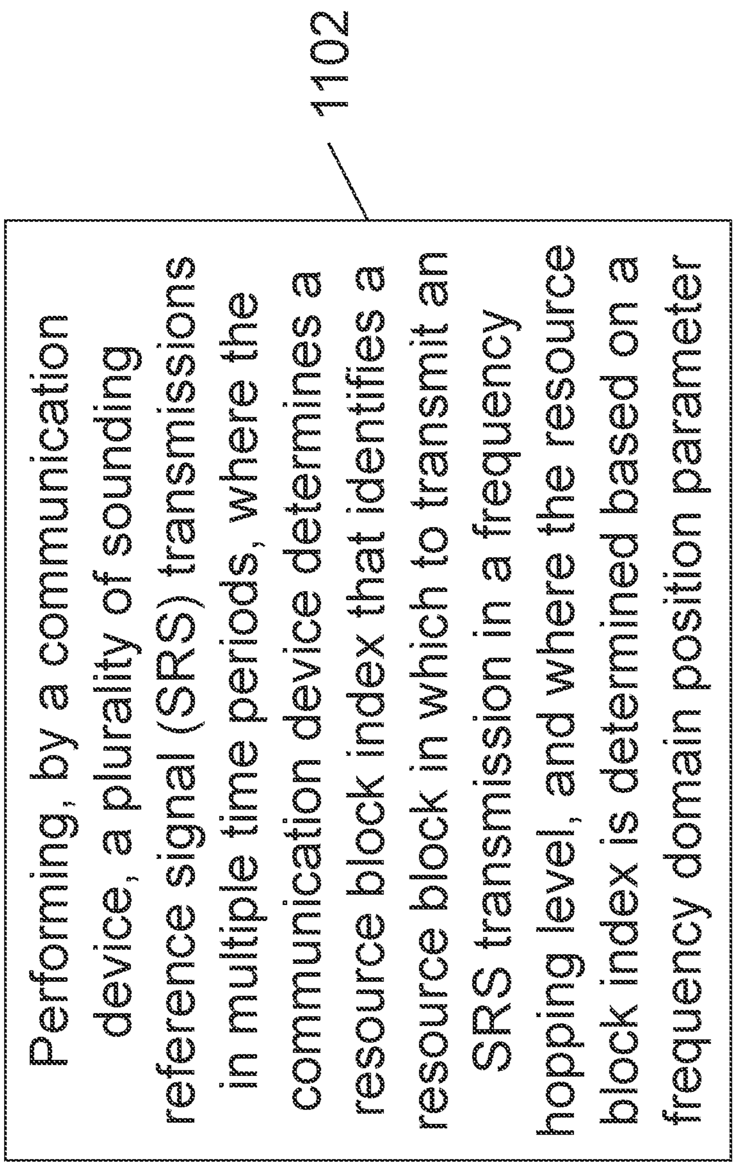
FIG. 11 shows an exemplary flowchart for performing a plurality of SRS transmissions.

FIG. 11 shows an exemplary flowchart for performing a plurality of SRS transmissions. Operation 1102 includes performing, by a communication device, a plurality of sounding reference signal (SRS) transmissions in multiple time periods, where the communication device determines a resource block index that identifies a resource block in which to transmit an SRS transmission in a frequency hopping level, and where the resource block index is determined based on a frequency domain position parameter.

In some embodiments, the frequency domain position parameter is updated in every X time periods, wherein X is an integer greater than 1. In some embodiments, the frequency domain position parameter is based on one or more of an SRS frequency domain position, an identifier of the communication device, or a time domain related value. In some embodiments, the frequency domain position parameter is based on one or more shift values, an identifier of the communication device, or a time domain related value.

Figure 12:
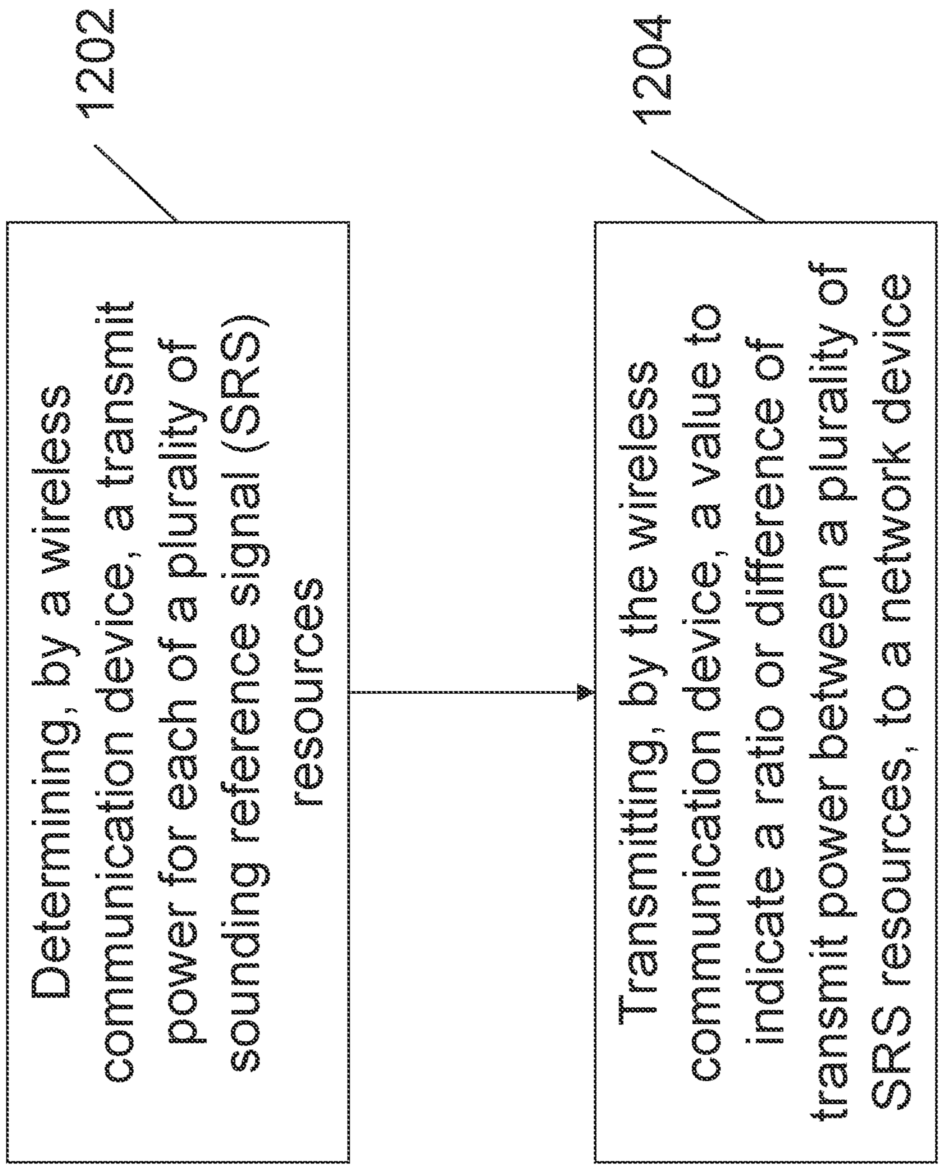
FIG. 12 shows an exemplary flowchart for transmitting a value to indicate a ratio or a difference of transmit power.

FIG. 12 shows an exemplary flowchart for transmitting a value to indicate a ratio or a difference of transmit power. Operation 1202 includes determining, by a wireless communication device, a transmit power for each of a plurality of sounding reference signal (SRS) resources. Operation 1204 includes transmitting, by the wireless communication device, a value to indicate a ratio or difference of transmit power between a plurality of SRS resources, to a network device.

In some embodiments, the plurality of SRS resources are for coherent joint transmission, or the plurality of SRS resources are for different TRPs. In some embodiments, different SRS resources are associated with same open loop power control parameter, closed loop power control parameter and respective path-loss RS, or different SRS resources are associated with respective open loop power control parameter, closed loop power control parameter and path-loss RS. In some embodiments, the method further comprises transmitting, by the wireless communication device to the network device, a reference SRS resource for the ratio or the difference, or determining, by the wireless communication device, a reference SRS resource for the ratio or the difference, based on a predefined index, a configured index or an indicated index in the plurality of SRS resources.

In some embodiments for the method shown in FIG. 12, a SRS resource can be replaced by a SRS resource burst, and each SRS resource burst can correspond to a TRP, and a power control parameter. One SRS resource comprises a plurality of SRS resource bursts. And reference index of SRS resource burst is determined. In some embodiments for the method shown in FIG. 12, a SRS resource can be replaced by one or more SRS resource sets in a SRS group. Multiple SRS groups are for CJT. Each SRS group corresponds to one TRP, and a power control parameter. One SRS resource group comprises one or more SRS resource sets. And reference index of SRS resource in a SRS resource set is determined.

Figure 13:
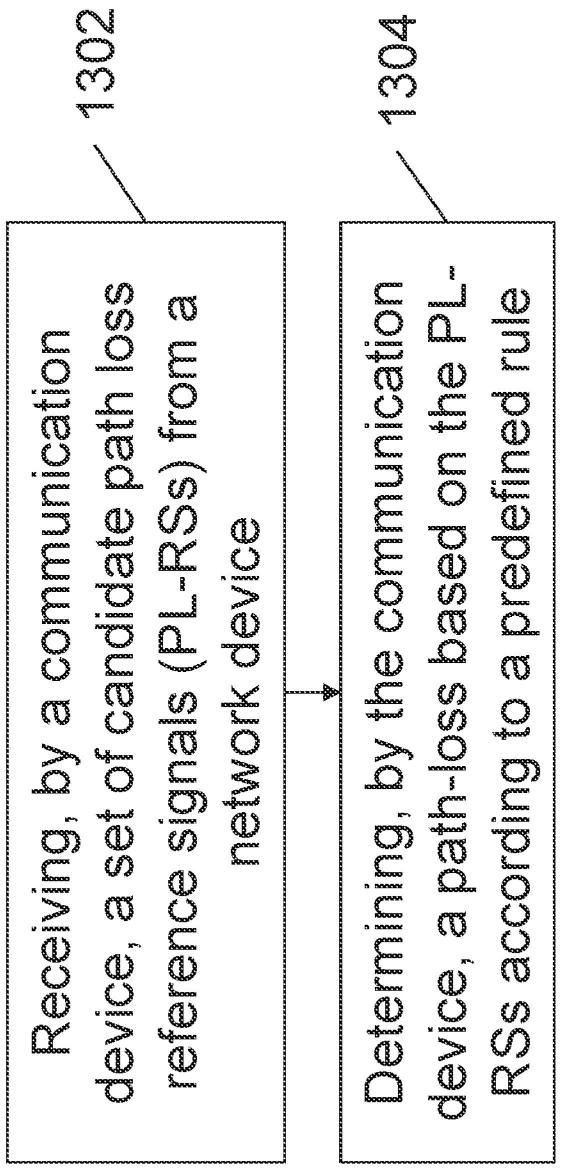
FIG. 13 shows an exemplary flowchart for determining a path-loss.

FIG. 13 shows an exemplary flowchart for determining a path-loss. Operation 1302 includes receiving, by a communication device, a set of candidate path loss reference signals (PL-RSs) from a network device. Operation 1304 includes determining, by the communication device, a path-loss based on the PL-RSs according to a predefined rule.

In some embodiments, the predefined rule indicates that the path-loss is determined using a maximum path-loss or an average path-loss from the set of candidate PL-RSs.

Figure 14:
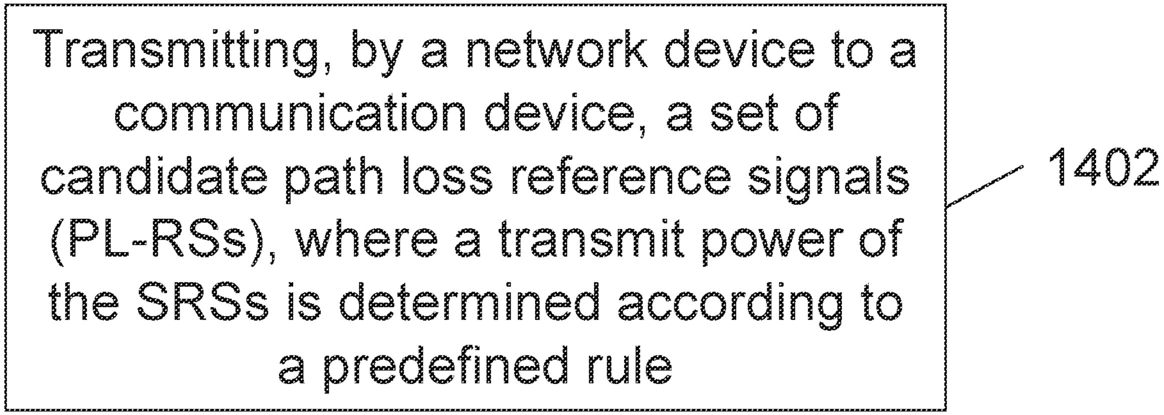
FIG. 14 shows an exemplary flowchart for transmission of a set of candidate path loss reference signals.

FIG. 14 shows an exemplary flowchart for transmission of a set of candidate path loss reference signals. Operation 1402 includes transmitting, by a network device to a communication device, a set of candidate path loss reference signals (PL-RSs), where a transmit power of the SRSs is determined according to a predefined rule. In some embodiments, the predefined rule indicates that the SRSs are transmitted to maximize a transmission power of the network device or a beam-specific transmit power.

Figure 15:
FIG. 15 shows another exemplary flowchart for performing a plurality of SRS transmissions.

FIG. 15 shows another exemplary flowchart for performing a plurality of SRS transmissions. Operation 1502 includes performing, by a communication device, a plurality of sounding reference signal (SRS) transmissions in multiple resource blocks in multiple time periods, where the communication device determines a resource block level hopping index that identifies a resource block in which to transmit an SRS transmission, where the resource block level hopping index is determined based on a scaling factor, and where the scaling factor is applied to an index of SRS transmissions (e.g., $n_{SRS}$) or a total number of the multiple time periods corresponding to a frequency hopping level $$\left(\text{e.g., } \prod_{b'=b_{hop}}^{B_{SRS}} N_{b'}\right).$$

In some embodiments, the scaling factor has a predefined value or a configured value.

In this document the term "exemplary" is used to mean "an example of" and, unless otherwise stated, does not imply an ideal or a preferred embodiment. In this document, the words "at least one of" can mean "any one or more of".

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

determining, by a wireless communication device, a transmit power for each of a plurality of sounding reference signal (SRS) resources for different transmission reception points (TRPs); and transmitting, by the wireless communication device, a value to indicate a ratio or difference of transmit power between a plurality of SRS resources, to a network device, wherein each of the plurality of SRS resources comprises a respective SRS resource, wherein each of the plurality of SRS resources comprises a respective SRS resource burst, or wherein each of the plurality of SRS resources comprises a respective SRS resource group, wherein the respective SRS resource group comprises one or more SRS resource sets.

2. The method of claim 1, wherein the plurality of SRS resources are for coherent joint transmission.

3. The method of claim 2, wherein different SRS resources are associated with same open loop power control parameter, closed loop power control parameter and respective path-loss RS.

4. The method of claim 2, further comprising:

transmitting, by the wireless communication device to the network device, a reference SRS resource for the ratio or the difference.

5. The method of claim 2, wherein different SRS resources are associated with respective open loop power control parameter, closed loop power control parameter and path-loss RS.

6. The method of claim 2, further comprising:

determining, by the wireless communication device, a reference SRS resource for the ratio or the difference, based on a predefined index, a configured index or an indicated index in the plurality of SRS resources.

7. An apparatus for wireless communication comprising at least one processor, configured to implement a method, the at least one processor configured to:

determine, by a wireless communication device, a transmit power for each of a plurality of sounding reference signal (SRS) resources for different transmission reception points (TRPs); and transmit, by the wireless communication device, a value to indicate a ratio or difference of transmit power between a plurality of SRS resources, to a network device, wherein each of the plurality of SRS resources comprises a respective SRS resource, wherein each of the plurality of SRS resources comprises a respective SRS resource burst, or wherein each of the plurality of SRS resources comprises a respective SRS resource group, wherein the respective SRS resource group comprises one or more SRS resource sets.

8. The apparatus of claim 7, wherein the plurality of SRS resources are for coherent joint transmission.

9. The apparatus of claim 8, wherein different SRS resources are associated with same open loop power control parameter, closed loop power control parameter and respective path-loss RS.

10. The apparatus of claim 8, wherein the at least one processor is further configured to:

transmit, by the wireless communication device to the network device, a reference SRS resource for the ratio or the difference.

11. The apparatus of claim 8, wherein different SRS resources are associated with respective open loop power control parameter, closed loop power control parameter and path-loss RS.

12. The apparatus of claim 8, wherein the at least one processor is further configured to:

determine, by the wireless communication device, a reference SRS resource for the ratio or the difference, based on a predefined index, a configured index or an indicated index in the plurality of SRS resources.

13. A non-transitory computer readable program storage medium having code stored thereon, the code, when executed by at least one processor, causing the at least one processor to implement a method, comprising:

determining, by a wireless communication device, a transmit power for each of a plurality of sounding reference signal (SRS) resources for different transmission reception points (TRPs); and transmitting, by the wireless communication device, a value to indicate a ratio or difference of transmit power between a plurality of SRS resources, to a network device, wherein each of the plurality of SRS resources comprises a respective SRS resource, wherein each of the plurality of SRS resources comprises a respective SRS resource burst, or wherein each of the plurality of SRS resources comprises a respective SRS resource group, wherein the respective SRS resource group comprises one or more SRS resource sets.

14. The non-transitory computer readable program storage medium of claim 13, wherein the plurality of SRS resources are for coherent joint transmission.

15. The non-transitory computer readable program storage medium of claim 14, wherein different SRS resources are associated with same open loop power control parameter, closed loop power control parameter and respective path-loss RS.

16. The non-transitory computer readable program storage medium of claim 14, wherein the method further comprises:

transmitting, by the wireless communication device to the network device, a reference SRS resource for the ratio or the difference.

17. The non-transitory computer readable program storage medium of claim 14, wherein different SRS resources are associated with respective open loop power control parameter, closed loop power control parameter and path-loss RS.

18. The non-transitory computer readable program storage medium of claim 14, wherein the method further comprises:

determining, by the wireless communication device, a reference SRS resource for the ratio or the difference, based on a predefined index, a configured index or an indicated index in the plurality of SRS resources.

* * * * *